United States Patent

Kunishige et al.

[11] Patent Number: 5,634,148
[45] Date of Patent: May 27, 1997

[54] ZOOM APPARATUS FOR A CAMERA HAVING COUNT GENERATING MEANS AND COUNT MODIFYING MEANS FOR ENHANCING ACCURACY AT SELECTED FOCAL LENGTHS

[75] Inventors: Keiji Kunishige; Minoru Hara, both of Hachioji, Japan

[73] Assignee: Olympus Optical Co., Ltd, Tokyo, Japan

[21] Appl. No.: 326,820

[22] Filed: Oct. 20, 1994

Related U.S. Application Data

[63] Continuation of Ser. No. 971,514, Nov. 3, 1992, abandoned.

[30] Foreign Application Priority Data

Nov. 5, 1991 [JP] Japan ............................ 3-288900
Jan. 31, 1992 [JP] Japan ............................ 4-016677

[51] Int. Cl.$^6$ .................................................. G03B 13/18
[52] U.S. Cl. ........................................ 396/86; 396/87
[58] Field of Search .......................... 354/195.1, 195.12, 354/400; 396/85, 86, 87

[56] References Cited

U.S. PATENT DOCUMENTS

| | | | |
|---|---|---|---|
| 4,537,487 | 8/1985 | Taniguchi et al. | 354/400 |
| 4,857,951 | 8/1989 | Nakajima et al. | 354/195.1 X |
| 5,036,348 | 7/1991 | Kusaka | 354/195.12 X |
| 5,077,571 | 12/1991 | Takayama et al. | 354/400 |
| 5,122,822 | 6/1992 | Morisawa et al. | 354/195.1 |
| 5,142,314 | 8/1992 | Ogawa | 354/195.1 |

FOREIGN PATENT DOCUMENTS 2-51310  4/1990  Japan.

*Primary Examiner*—Safet Metjahic
*Assistant Examiner*—J. K. Han
*Attorney, Agent, or Firm*—Louis Weinstein

[57] ABSTRACT

The present invention is directed to a zoom encoder for detecting an amount of angular movement and a direction of angular movement of a cam ring which is angularly moved about an optical axis of a photographing optical system to change a focal length of the photographing optical system. The zoom encoder is characterized by comprising a pulse generator of non-contact type for generating pulse signals in accordance with the angular movement of the cam ring that serves as a drive for changing the focal length of the photographing optical system, a counter for selectively adding or subtracting the pulse signals in accordance with the direction of angular movement of the cam ring, a position detector for detecting a predetermined position signal at least in the vicinity of a wide angle end and in the vicinity of a telephoto end of the focal length, a count-value modifier for modifying the count value of the counter to a predetermined value in accordance with a change in an output from the position detector, and a zoom-information detector for producing zoom information on the basis of the output from the counter.

9 Claims, 18 Drawing Sheets

ZOOM APPARATUS FOR A CAMERA HAVING COUNT GENERATING MEANS AND COUNT MODIFYING MEANS FOR ENHANCING ACCURACY AT SELECTED FOCAL LENGTHS

This is a continuation of application Ser. No. 07/971,514, filed Nov. 3, 1992, now abandoned.

BACKGROUND OF THE INVENTION

1. Field of the Invention

The present invention relates to zoom encoders and, more particularly, to a zoom encoder for use in a focal-length detecting apparatus of a zoom photographing optical system in a camera or the like.

2. Related Art And Prior Art Statement

As being known well, as a focal-length detecting apparatus of a zoom photographing optical system in a camera or the like, there are many arrangements in which an amount of angular movement and a direction of angular movement are detected by a zoom encoder of a cam ring which changes a focal length of the photographing optical system.

The zoom encoder is arranged such that, in order to detect a rotational position of the cam ring which executes zooming by rotation, a code plate of a few bits is provided, and a brush is in contact with the code plate to detect the rotational position of the cam ring. Detection of the rotational position due to this code plate has an advantage that the rotational position of the cam ring can be detected as bit information from the code plate, but has the following disadvantages: That is, 1) Manufacturing cost of the code plate is high;

2) Since the bit information is produced by contact of the brush with the code plate, conduction failure due to oxidization of a surface of the code plate and a surface of a brush occurs with the passage of time; and 3) Conduction failure due to insufficient pressure contact, wear or abrasion of the surface, or the like occurs with the passage of time.

Of these disadvantages, the fact that failure occurs with the passage of time, particularly like the above-described disadvantages 2) and 3) means that failure occurs after the focal-length detecting apparatus has been passed over hands of a user. This raises an extremely serious problem in view of the quality of products.

On the other hand, as means for solving the above-described disadvantages 2) and 3), it is considered to use an absolute-value encoder of non-contact type like an optical type using a photo-reflector or the like or a magnetic type using an MRE (Magneto-Resistive Element) or the like.

However, the use of such means is large or high in demerit in view of a needed space and cost thereof. The higher the resolution of a zoom encoder, the more the enlargement of the demerit. Means considered to be possible practically is limited at the most to one of 2–3 bits.

In view of the above, as disclosed in U.S. Pat. No. 5,122,822, means has been proposed in which an optical pulse generator is provided for generating pulses in response to rotation of a cam ring which executes zooming, a pulse output from the generator is counted up or counted down in accordance with a rotational direction of the zooming cam ring, to thereby find a rotational position of the cam ring, and a focal length and an open F-value are found on the basis of the rotational position.

However, the prior art has the following problem. That is, pulses generated by the pulse generator are counted when a main switch is turned on to angularly move the cam ring toward a long focal point from a condition in which a lens is angularly moved toward a shortest focal point and is stopped. Accordingly, if zooming operations are repeated how many times under such a condition that the lens is not brought to the shortest focal point, information of the lens slips off or shifts gradually under the influence of backlash of gears or the like.

OBJECTS AND SUMMARY OF THE INVENTION

It is a first object of the invention to dissolve disadvantages of the above-described prior art.

It is a second object of the invention to reduce the above-described shift or deviation in positional information, as far as possible.

It is a third object of the invention to execute positioning of a wide end and a tele end of a lens barrel more accurately.

Briefly, according to the invention, there is provided a zoom encoder moved angularly about an optical axis of a photographing optical system, for detecting an amount of angular movement and a direction of angular movement of a cam ring which changes a focal length of the photographing optical system, characterized by comprising pulse generating means of non-contact type for generating a plurality of pulse signals in accordance with angular movement of the cam ring that is employed as drive means for changing a focal length of the photographing optical system, count means for adding or subtracting the pulse signals in accordance with the direction of angular movement of the cam ring, position detecting means for detecting a predetermined position signal at least in the vicinity of a wide angle end and in the vicinity of a telephoto end of the focal length, count-value modifying means for modifying a count value of the count means to a predetermined value in accordance with a change in an output from the position detecting means, and zoom-information detecting means for obtaining zoom information on the basis of an output from the count means.

These objects and advantages of the present invention will become further apparent from the following detailed explanation.

BRIEF DESCRIPTION OF THE DRAWINGS

FIG. 16 is a flow chart of a program in a power-on routine when a power switch of the zoom camera to which the second embodiment of the invention is applied is turned on;

FIG. 17 is a flow chart of a program in a ZU routine when a zoom-up switch of the zoom camera to which the second embodiment of the invention is applied is turned on;

FIG. 18 is a flow chart of a program in ZD routine when a zoom-down switch of the zoom camera to which the second embodiment of the invention is applied is turned on.

DETAILED DESCRIPTION OF THE PREFERRED EMBODIMENTS

Various embodiments of the invention will hereunder be described with reference to the accompanying drawings.

Figure 1:
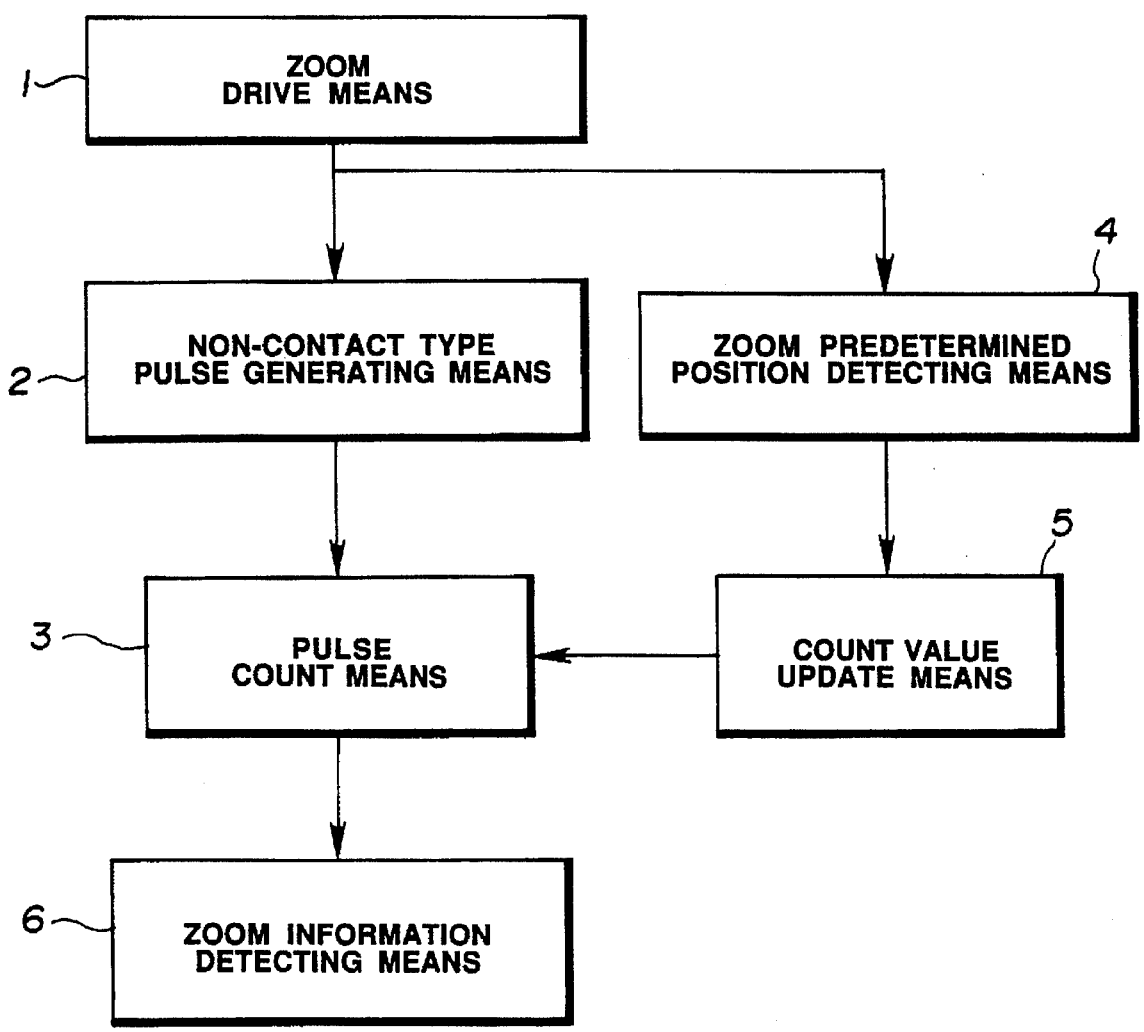
FIG. 1 is a conceptional view in block diagram form showing a fundamental or basic arrangement of a zoom encoder according to a first embodiment of the invention.

FIG. 1 is a conceptional view showing a basic arrangement of a first embodiment according to the invention.

An encoder of the first embodiment is a zoom encoder for detecting an amount of angular movement and a direction of angular movement of a cam ring which alters or changes a focal length of a photographing optical system by angular movement of the encoder about an optical axis of the photographing optical system. The encoder has a principal portion thereof which comprises:

pulse generating means 2 of non-contact type for generating a pulse signal in accordance with angular movement of the cam ring that is drive means 1 which changes a focal length of the photographing optical system, count means 3 for adding or subtracting the pulse signal in accordance with the direction of angular movement of the cam ring, position detecting means 4 for detecting a predetermined position signal at least in the vicinity of a wide-angle end and in the vicinity of a telephoto end of the focal length, count-value modifying means 5 for modifying a count value of the count means 3 to a predetermined value in accordance with a change in output from the position detecting means 4, and zoom-information detecting means 6 for obtaining zoom information on the basis of the output from the count means 3.

The basic or fundamental function of the first embodiment will be described. When reaching is made to an intermediate position in a zoom movement range, a count value of the count means is updated to a count value corresponding to an accurate focal length, regardless of pulse count numbers until now.

Figure 2:
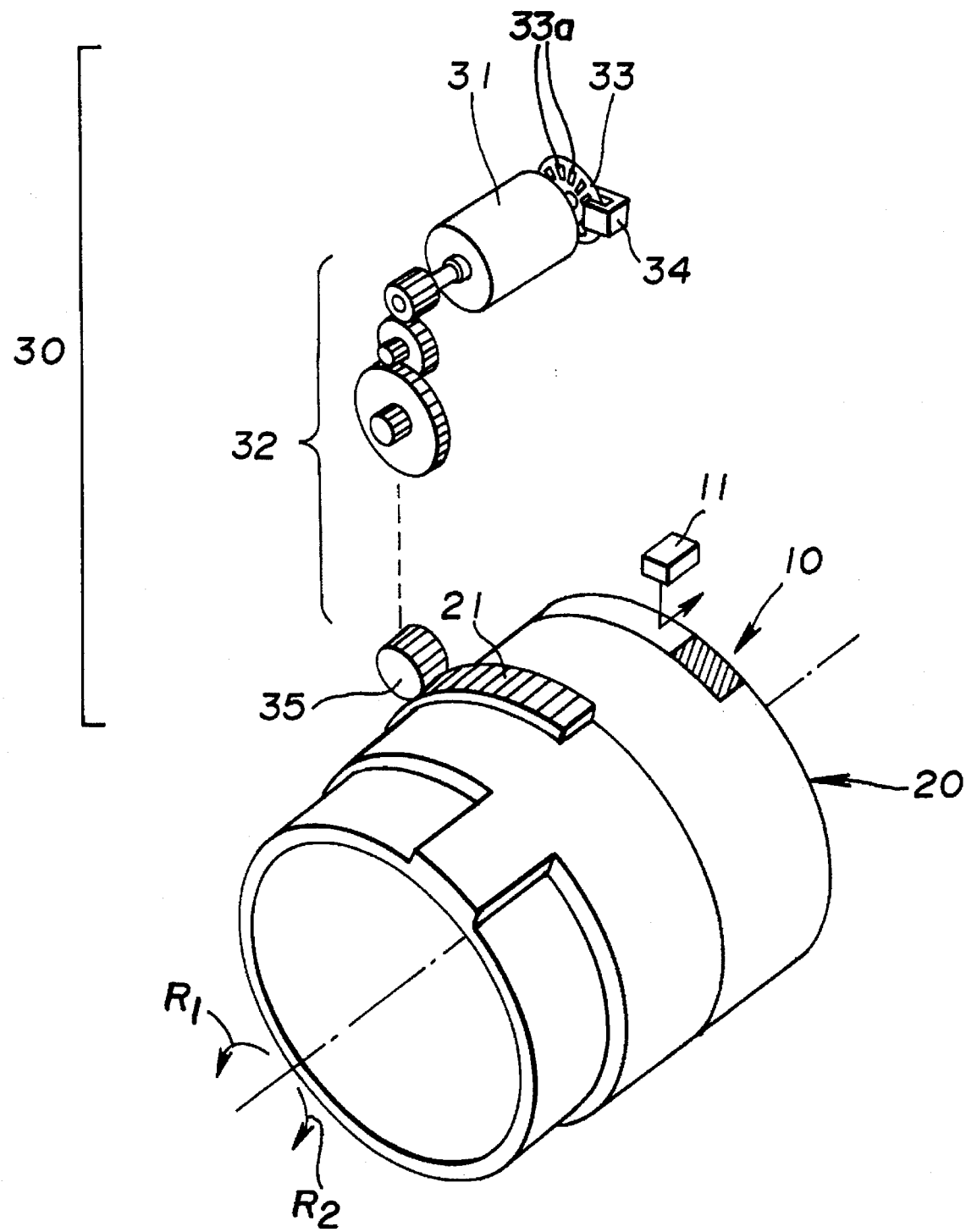
FIG. 2 is a perspective view of the zoom encoder, showing the first embodiment of the invention in further detail.

FIG. 2 is an explanatory view showing the first embodiment in further detail. An example in which the zoom encoder 10 according to the first embodiment is applied to a lens barrel of a zoom lens of a camera ls shown.

Figure 3:
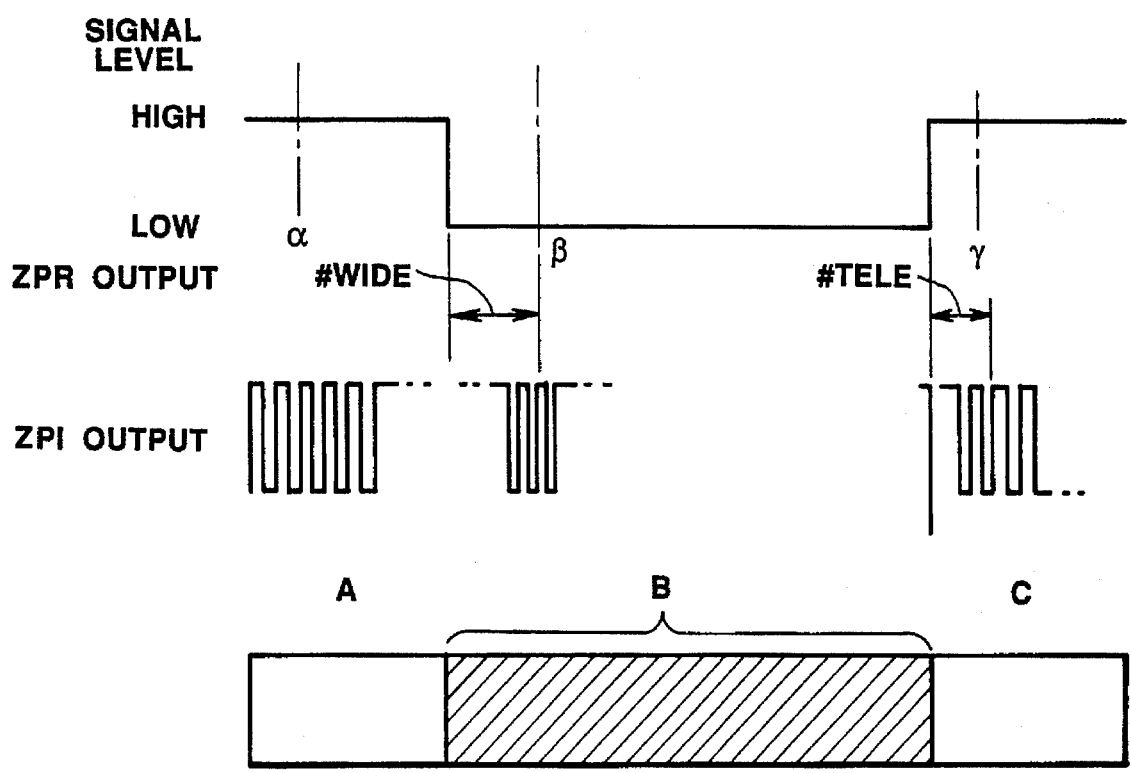
FIG. 3 is a diagrammatic view showing the relationship between a reading pattern of a photo-reflector and an output from the photo-reflector in the first embodiment of the invention.

The zoom encoder 10 provided on a rotary annulus or ring 20 consists of three parts including a drum sinking section A, a photographing range section B and an area C exceeding a tele end position, as shown In FIG. 3. Of these parts, the section A and the section C are a silver color or a white color high in reflectance, and the section B is a black color low in reflectance. Further, the rotary ring 20 is moved angularly in a direction indicated by the reference numeral R1 or R2 in FIG. 2 to drive the zoom lens. By the angular movement of the zoom encoder 10, an output signal from a zoom photo-reflector 11 (ZPR) fixed at a predetermined position within the camera body changes. That is, when the photo-reflector 11 faces a position indicated by a in FIG. 3, the lens is under a drum sinking condition. When the photo-reflector 11 faces a position of β, the lens is in the wide end position. When the photo-reflector faces a position of γ, the lens Is in the tele end position.

Here, #WIDE is an amount of angular movement of the cam ring from the point of time an output from the photo-reflector 11 Is switched from an "H" level to an "L" level to the point of time the lens reaches the wide end position in keeping with angular movement of the cam ring, while #TELE is an amount of angular movement of the cam ring until the lens reaches the tele end from the point of time the output from the photo-reflector is switched from the "L" level to the "H" level. These angular movements function respectively as regulating values for accurately positioning the cam ring to the wide end position and the tele end position.

A zoom drive unit 30 comprises a zoom motor 31, a reduction gear train 32, a plurality of slits 33a in a disc 33 provided on an extension of a shaft of the zoom motor 31 and angularly moved in interlocking with the zoom motor 31, a zoom photo-interrupter 34 (ZPI) arranged in the vicinity of the slits 33 and generating an output signal in accordance with angular movement of the slits 33, and an output gear 35 in mesh with a final gear of the reduction gear train 32 and in mesh with a drive gear 21 provided on an outer periphery of the rotary ring 20 to transmit a rotatively moving force of the zoom motor 31 to the rotary ring 20.

In connection with the above, an output end of the photo-reflector 11 and an output end of the photo-interrupter 34 are connected to a CPU 101 (refer to FIG. 4) to be described subsequently so that the CPU 101 detects a current focal length on the basis of an output signal from the photo-reflector 11 and an output signal from the photo-interrupter 34. Moreover, an output from the photo-interrupter 34 is stored in RAM within the CPU 101 as ZMPLS representing a current position of the lens.

Figure 4:
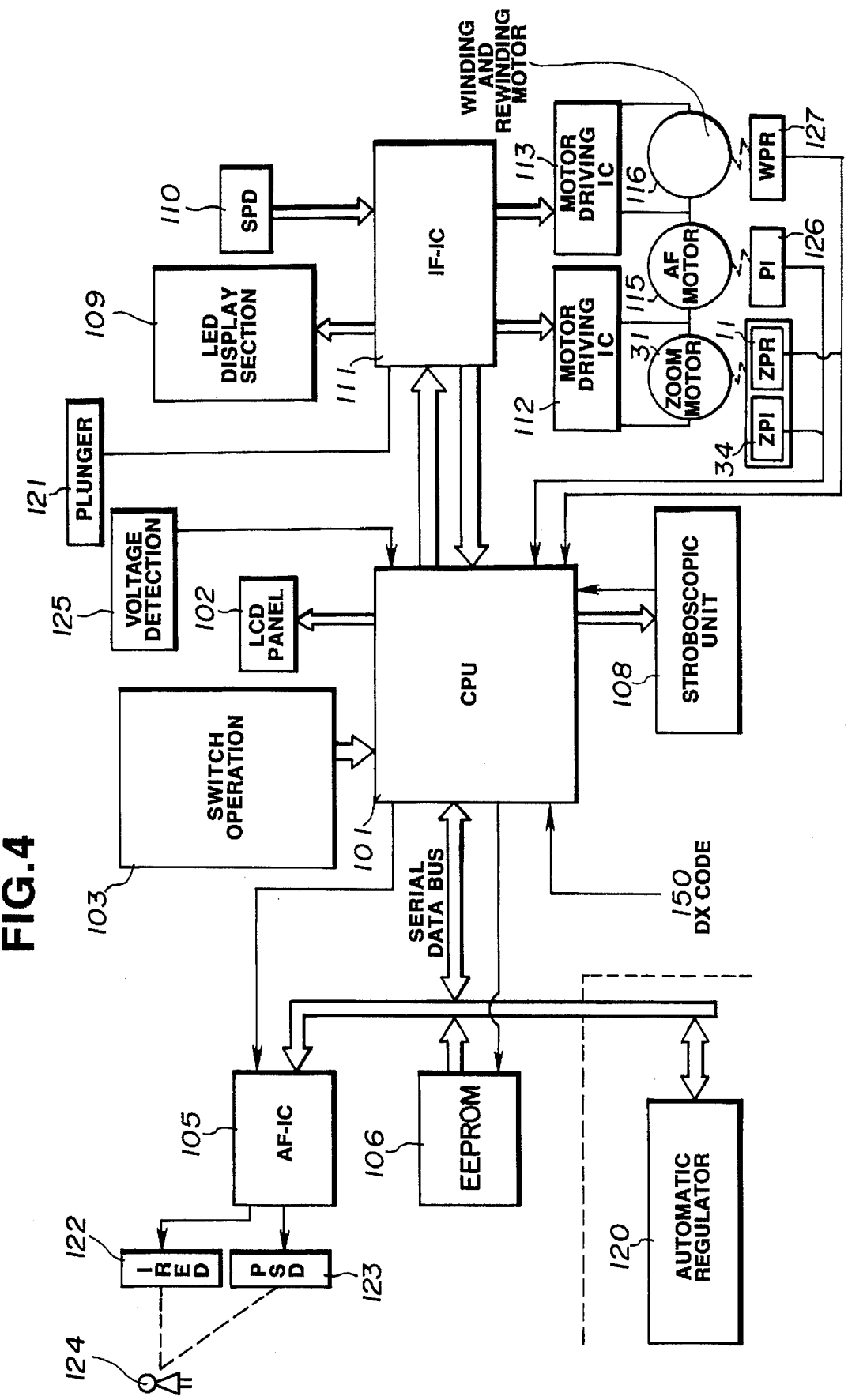
FIG. 4 is a block arrangement view showing an electric circuit of a principal portion of the zoom encoder according to the first embodiment of the invention.

FIG. 4 is a block system view of a zoom camera to which the first embodiment of the invention is applied.

In FIG. 4, the CPU 101 is a microcomputer for controlling operation of the entire zoom camera, and governs sequence control of operation of the zoom camera, computation of autofocus/auto-exposure (hereinafter referred to as "AF/AE"), A/D conversion, LCD/LED control and switch input control.

An LCD panel 102 is a liquid crystal display plate for displaying the number of frames of a film, the results of battery check, and the like.

A switch operating section 103 comprises a first-stage switch 1R which operates when a release button is half-depressed to lock AF and AE, a secondstage switch 2R for shutter release, which operates when the release button is fully depressed, a zoom-up switch Z-UP, a zoom-down switch Z-DOWN, a power-on switch POWER for causing the LCD panel 102 to execute display and for bringing the camera to a condition capable of photographing when the power-on switch POWER is turned on, a forcibly rewinding switch RW for executing rewinding during photographing, and a rear-closure opening and closing switch BK for detecting that a rear closure is closed, to execute null feed.

Furthermore, in FIG. 4, the reference numeral 105 denotes an IC (AFIC) for distance measurement of AF; 122, a light emitting diode (IRED); 123, a position sensor (PSD); and 124, a subject. The AFIC 105 emits an infrared light to the subject 124 on the basis of a control signal from the CPU 101, and detects a reflected light of the infrared light by the PSD 123 to execute distance measurement. Obtained distance measured data are transmitted to the CPU 101 through a serial data bus.

An EEPROM 106 is an electrically erasable ROM, and stores therein various regulating values such as the numbers of film frames, voltage correction value stroboscopic charging voltage information, battery check Information and the like.

A stroboscopic unit 108 is arranged such that the stroboscopic unit 108 starts charging when a charge signal is given from the CPU 101, a charge voltage Is sent to the CPU 101, the charge voltage is converted In A/D, subsequently, the converted voltage is compared with charge-voltage Information of the EEPROM 106, and it is checked whether or not charging is completed.

An LED display section 109 is a display portion informing a photographing person of a stroboscopic light emitting warning, an A/F lock and the like.

An IF-IC 111 comprises an LED drive circuit that is an interface IC, a circuit for executing light measurement by an SPD 110, a motor drive circuit, a reference-voltage circuit and the like.

The reference numerals 112 and 113 denote motor driving ICs, respectively. A motor drive signal sent from the CPU 101 is once decoded within the IF-IC 111, and, subsequently, is supplied to the driving ICs 112 and 113. Any motor of the zoom motor 31, an AF motor 115 and a winding and rewinding motor 116 is selected by the signal from the CPU 101 and is driven.

A photo-interrupter 126 for generating an output signal in interlocking relationship with angular movement of the motor 115 is provided in the vicinity of the AF motor 115. The CPU 101 executes control of angular movement of the AF motor 115 on the basis of an output from the photo-interrupter 126.

A photo-interrupter 127 for generating an output signal in interlocking relationship with angular movement of the motor 116 is also provided similarly in the vicinity of the winding and rewinding motor 116. The CPU 101 executes control of angular movement of the motor 116 on the basis of the output from the photo-interrupter 127.

The zoom motor 31 is controlled by the CPU 101 on the basis of the output signal from the photo-interrupter 34 and the output signal from the photo-reflector 11, as described previously.

An automatic regulator 120 is used as a checker when AF, AE, battery check, stroboscopic regulation and the like are executed at a factory. These data are sent to the CPU 101 through the serial data bus, and regulation values are stored in the EEPROM 106.

A DX code 150 of the film is directly read into the CPU 101, and is used as a computation value for deciding an exposure value.

The reference numeral 121 denotes a plunger for opening and closing a sector. The reference numeral 125 denotes a detecting section of battery voltage which resets the CPU 101 at turning-on of the battery and at voltage returning.

Function of the zoom camera to which the first embodiment of the invention is applied will next be described with reference to flow charts shown respectively in FIGS. 5–8.

Figure 5:
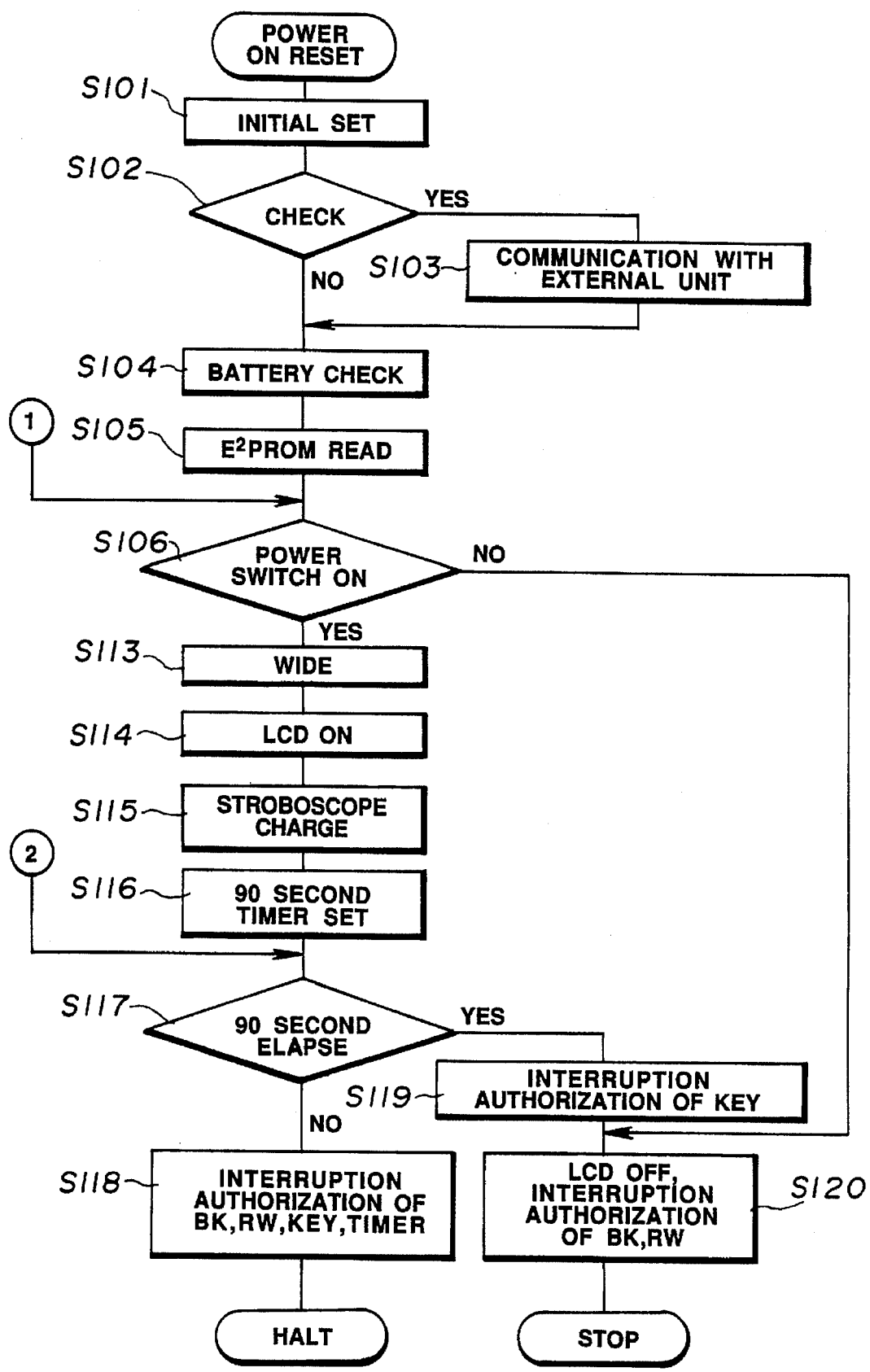
FIG. 5 is a flow chart showing a subroutine at the time of power-on reset, when a power source is turned on in a zoom camera to which the first embodiment of the invention is applied.

FIG. 5 is a flow chart of a subroutine of power-on reset when a power source is turned on to the zoom camera.

In FIG. 5, when the battery is inserted or the power switch POWER is switched, power-on reset is applied to the CPU 101 so that operation of the camera starts. When the subroutine of the power-on reset is called, initial setting of ports and RAM within the CPU 101 is first executed in Step S101 and, subsequently, check judgment is executed as to whether or not the automatic regulator 120 is connected to the CPU 101 in Step S102. If the results of the check indicate that the automatic regulator 120 is connected to the CPU 101, a program proceeds to Step S103 where communication to an external unit is executed. Moreover, if the automatic regulator 120 is not connected to the CPU 101, the program immediately proceeds to Step S104 where battery check is executed. Here, in a case where battery voltage is insufficient, it is displayed on the LCD panel 102 that there is no battery, and all operation of the camera is inhibited.

Subsequently, in Step S105, predetermined data are read from the EEPROM 106 and, subsequently, a power switch POWER is checked in Step S106. Here, if the power switch POWER is turned off, the program proceeds to Step S120 where display of the LCD panel 102 is erased, and interruption of the switches BK and RW executing opening and closing of the rear closure and forcible rewinding is permitted or allowed and, subsequently, a condition is brought to a stop mode condition. If the power switch POWER is turned on in Step S106, the zoom lens is moved from the drum sinking position to the wide end position capable of photographing in Step S113. The program proceeds to Step S114 where predetermined information is displayed by the LCD panel 102. Subsequently, stroboscopic charge is executed in Step S115, so as to be brought to a condition capable of photographing.

Figure 6:
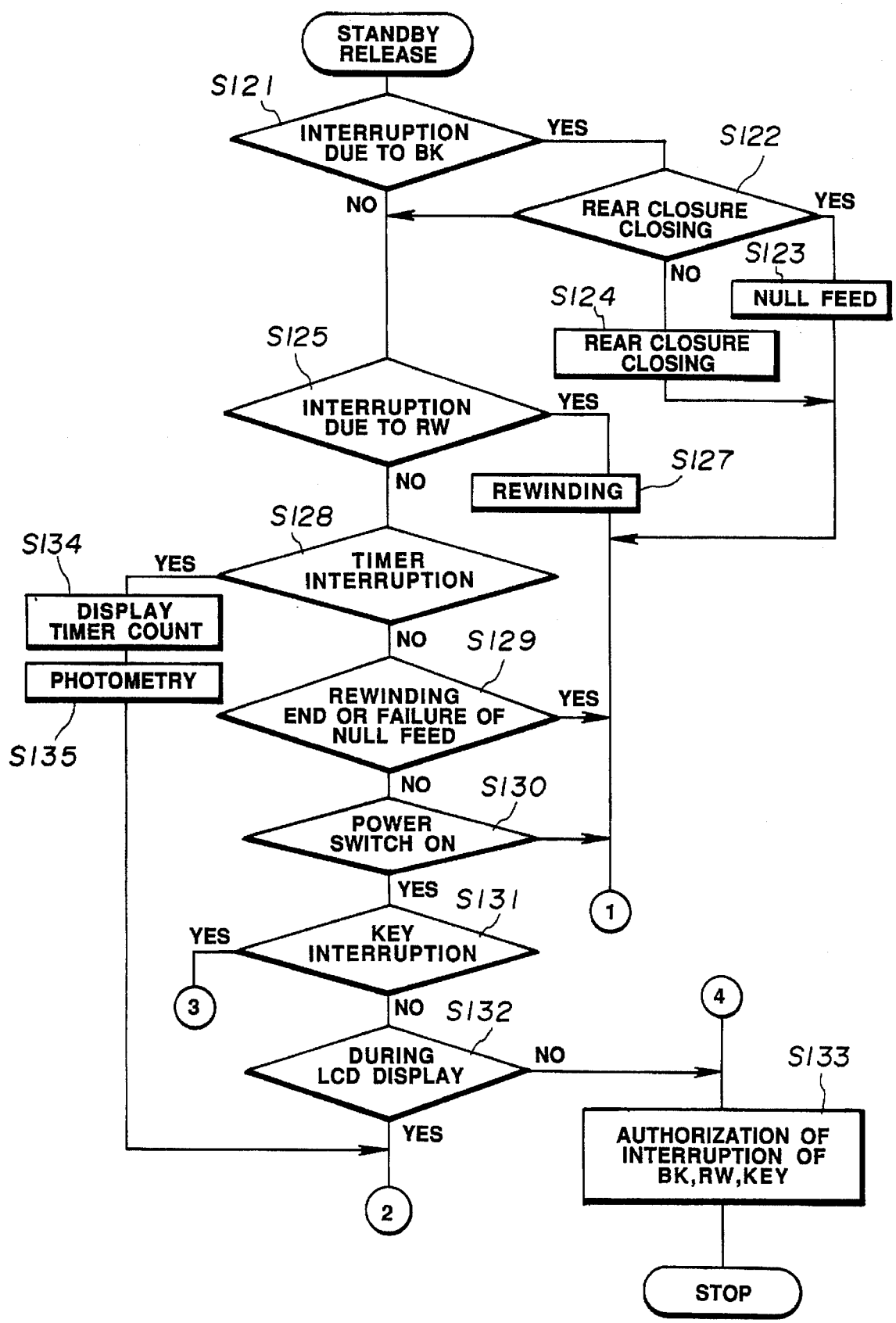
FIG. 6 is a flow chart showing a subroutine at release of standby, of the zoom camera to which the first embodiment of the invention is applied.

In Step S116, display time to the LCD panel 102 is set to, for example, 90 sec. If the user operates any one of the Steps, a timer of 90 sec is again set. The program proceeds to Step S117 where it is judged whether or not 90 sec elapses. If 90 sec elapses, the program proceeds to Step S119, while, if 90 sec does not elapse, the program proceeds to Step S118 where interruption of the opening and closing switch BK of the rear closure, the rewinding switch RW and other operating switches (hereinafter referred to as "KEY") is authorized or permitted, and the condition is brought to a halt mode condition. When a switch in which interruption is authorized under the stop mode condition and the halt mode condition is depressed, a subroutine of stand-by release illustrated in FIG. 6 is executed.

The subroutine of the stand-by release will next be described with reference to the flow chart in FIG. 6.

Interruption due to the rear-closure switch BK is first checked in Step S121. Here, if there is interruption due to the rear-closure switch BK, the program proceeds to Step S122 where it Is Judged whether or not the rear closure is closed. In Step S122, if the rear closure is not closed, the program proceeds to Step S124 where processing is executed to open the rear closure and, subsequently, the program is returned to "1" in FIG. 5. Further, if the rear closure is closed, null feed processing is executed in Step S123 and, subsequently, the program is returned to "1".

In Step S125, interruption due to the rewinding switch RW is checked. Here, if there is interruption due to the rewinding switch RW, the program proceeds to Step S127 where rewinding of the film is executed.

In Step S128, timer interruption is checked. Here, if there is timer interruption, the program proceeds to Step S134 where display timer count processing is executed. Subsequently, in Step S135, light measurement is executed, and the program is returned to "2" in FIG. 5. In a case where, in Step S128, it is not the timer interruption, the program proceeds to Step S129 where it is checked as to whether film rewinding is completed or idle feed is failure. Here, if the film rewinding is completed or the null feed is failure, the program is returned to "1" in FIG. 5 so that the camera does not operate. Furthermore, if the film rewinding is completed or the null feed is not failure, the program proceeds to Step S130. In this Step S130, a condition of the power switch POWER is checked. If the power switch POWER is turned off, the program proceeds to "1", while, if the power switch POWER is turned on, the program proceeds to Step S131 where a main flow continues as it is.

In Step S131, Judgment of the interruption due to the KEY is executed. If mode switches to be described subsequently are depressed so that interruption occurs, the program is blown to "3" in FIG. 7, while, if there is no interruption, the program proceeds to Step S132.

In Step S132, it is checked whether or not any information is under being displayed on the LCD panel 102. If the information is not during being displayed, the program proceeds to Step S133 where interruption of KEY such as various switches BK, RW and the like is permitted so that a condition is brought to a stop mode condition. In Step S132, if the LCD panel 102 is during being displayed, the program is returned to "2" in FIG. 5.

In connection with the above, KEY in each of Step S117. Step S131 and Step S133 refers to a switch in the switch operating section 103 shown in FIG. 4.

A subroutine of the above-described KEY interruption processing will next be described with reference to FIG. 7.

Figure 7:
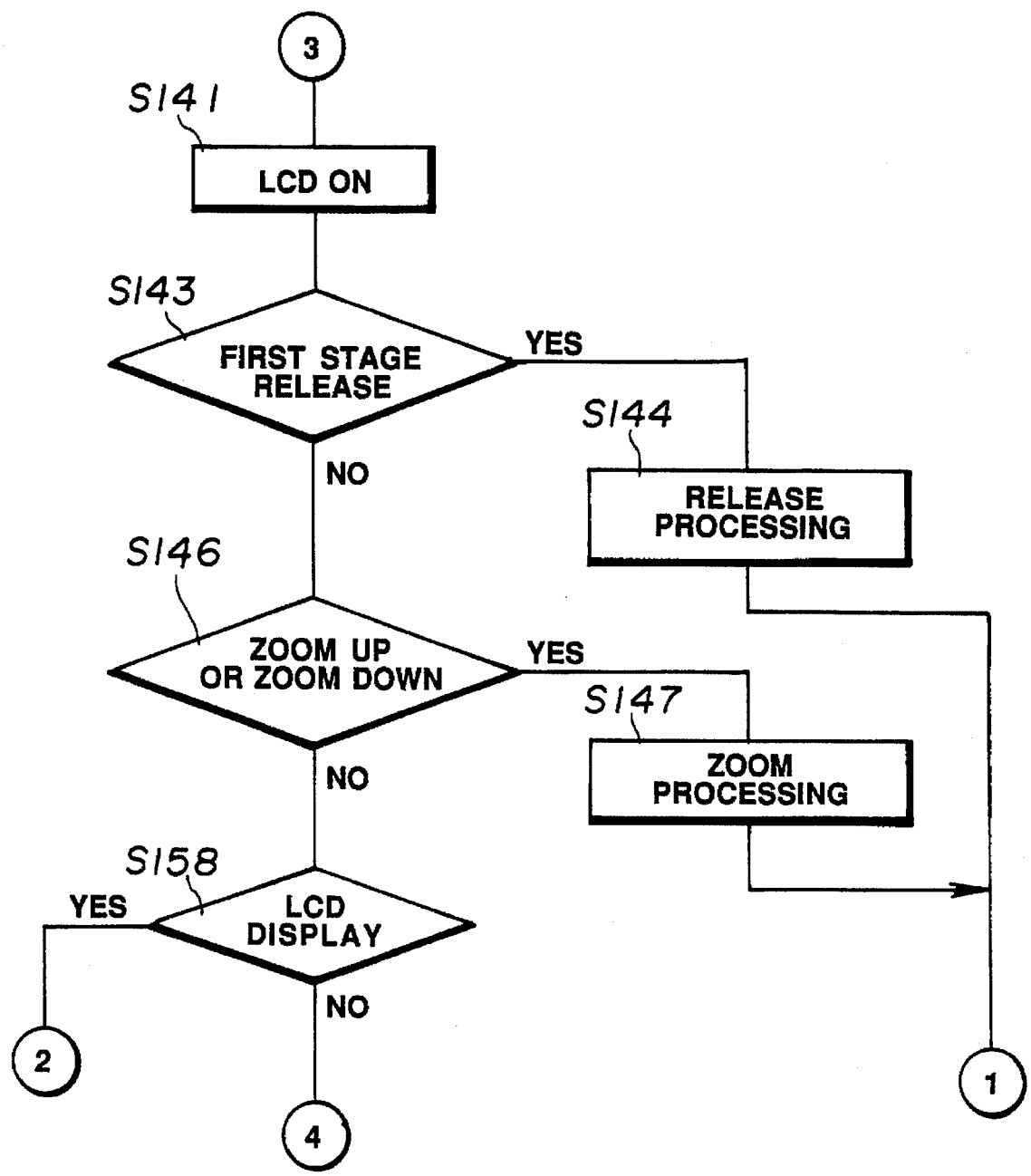
FIG. 7 is a flow chart of subroutine of interruption processing due to switch operation in the zoom camera to which the first embodiment of the invention is applied.

If there is the KEY interruption in Step S131 (refer to FIG. 6), the program proceeds to Step S141 in FIG. 7 where the LCD panel 102 (refer to FIG. 4) is turned on. Subsequently, the program proceeds to Step S143 where it is checked whether or not the first-stage release switch 1R is depressed. If the first-stage release switch 1R is depressed, release processing is executed in Step S144 and, subsequently, the program is returned to "1" in FIG. 5. If the first-step release switch 1R is turned off in Step S143, the program proceeds to Step S146. If indication of zoom-up or zoom-down is made, the program proceeds to Step S158. In this Step S158, it is checked whether or not the LCD panel 102 is during being displayed. If the LCD panel 102 is during being displayed, the program is returned to "2" in FIG. 5, while, if the LCD panel 102 is not during being displayed, the program is returned to "4" in FIG. 6.

In Step S146, when there is an indication of zoom-up or zoom-down, the program proceeds to Step S147 where zoom processing is executed.

Figure 8:
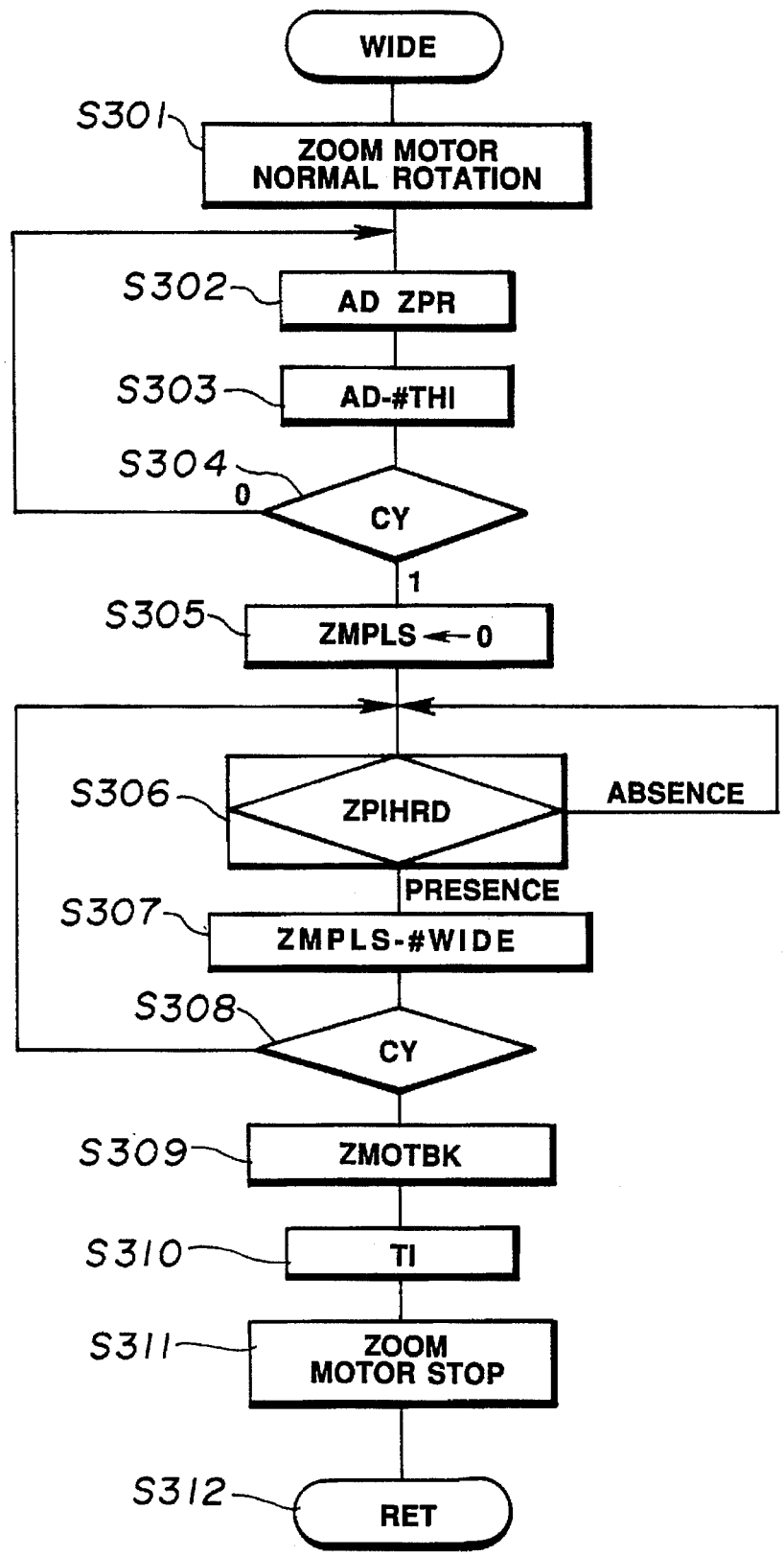
FIG. 8 is a flow chart showing operation when the zoom lens is moved from a drum sinking position to a wide end position capable of photographing, in the zoom camera to which the first embodiment of the invention is applied.
Figure 10:
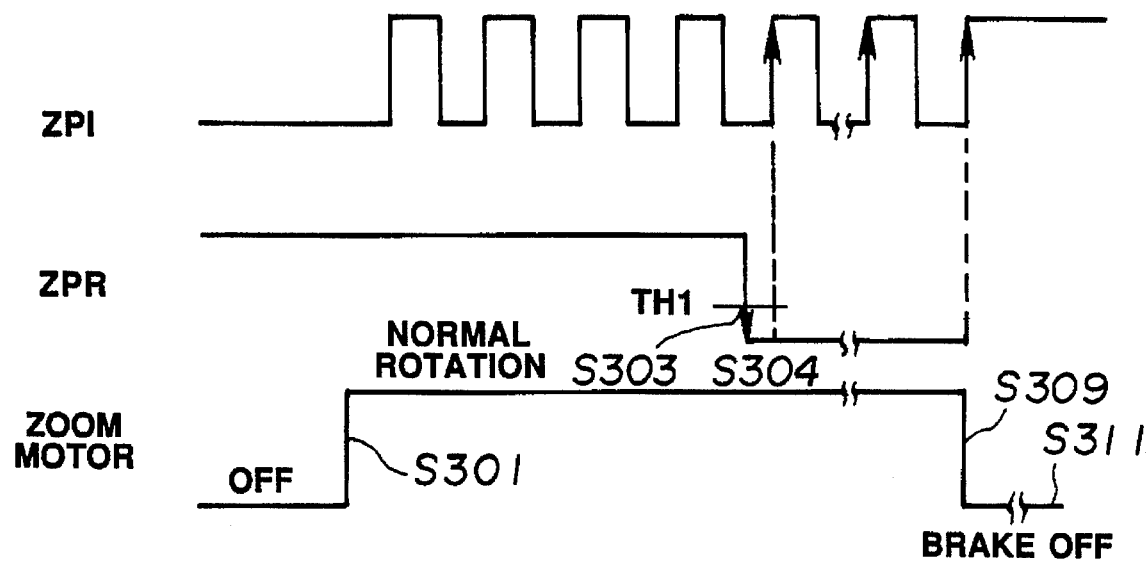
FIG. 10 is a time chart showing the relationship between a zoom motor and output signals from a zoom photo-reflector and a zoom photo-interrupter when the zoom lens is moved from the drum sinking position to the wide end position capable of photographing, in the zoom camera to which the first embodiment of the invention is applied.

A step of moving the zoom lens from the drum sinking position to the wide end position capable of photographing in Step S113 in FIG. 5 will next be described in further detail with reference to a flow chart in FIG. 8 and FIG. 10.

In Step S301, the zoom motor 31 (refer to FIG. 4) is normally rotated. In Step S302, an output signal from the photo-reflector 11 (ZPR, refer to FIG. 4) is A/D-converted. Subsequently, in Step S303, a predetermined threshold value #TH1 is subtracted from the A/D converted value.

Subsequently, in Step S304, the subtraction results in Step S303 are judged (CY). If borrow is not gotten out, the A/D value is higher than the threshold value #TH1. That is, the output signal from the photo-reflector 11 is Judged as being the "H" level, and the program is returned to Step S302. If the A/D value becomes lower than the threshold value #TH1, it is Judged that the output signal from the photo-reflector 11 becomes the "L" level, and the program proceeds to Step S305.

In Step S305, ZMPLS on RAM within the CPU 101 indicating the current value of the zoom lens is reset. That is, ZMPLS is reset at-the time the photo-reflector output changes from the "H" level to the "L" level. Subsequently, in Step S306, the output from the photo-interrupter 34 (ZPI, refer to FIG. 4) is checked (ZPIHRD). Each time a leading edge is detected, the ZMPLS is brought to +1.

Subsequently, in Step S307, a value #WIDE indicating the wide end position is subtracted from the current value ZMPLS of the zoom lens. The subtraction results are judged (CY) in Step S308. If there is borrow, it is judged as being not still the wide end position, and the program is returned to Step S306. If there is no borrow, it is judged as reaching the wide end position, and the program proceeds to Step S309.

In Step S309, brake is applied to the zoom motor 31 (ZMOTBK). In Step S310, stand-by is made for a predetermined period of time (TI). Subsequently, in Step S311, the zoom motor 31 is stopped so that the program is returned to the main routine (Step S312).

Zoom processing in Step S147 will next be described with reference to the flow chart in FIG. 9.

In Step S501, port initialization of the CPU 101 (refer to FIG. 4) required for driving of the zoom motor and start-up of the IFIC 111 are executed. Subsequently, in Step S502, a flag ZUDF indicating the driving direction of the zoom motor 31 (refer to FIG. 4) is seen. If the flag ZUDF=1, the program proceeds to Step 504 so as to normally rotate the zoom motor 31. When the flag ZUDF=0 in Step S502, the program proceeds to Step S503 so as to reversely rotate the zoom motor 31.

Subsequently, in Step S511, it is checked whether or not the zoom switch ZSW, that is, any one of the zoom-up switch Z-UP and the zoom-down switch Z-DOWN is turned on (ZSWCK). If the zoom switches ZSW are turned off, the program proceeds to Step S516.

When any one of the zoom-up switch Z-UP and the zoom-down switch Z-DOWN is turned on in Step S511, the program proceeds to Step S512.

In Step S512, it is judged whether the zoom position becomes the wide end position or the tele end position by the ZMPLS indicating the current value of the zoom lens. When the zoom position reaches any one of the wide end position and the tele end position, the program proceeds to Step S516 to stop the zoom motor 31. Further, when the zoom lens position does not reach the wide end position or the tele end position in Step S512, the program next proceeds to Step S513.

In Step S513, the output signal from the photo-reflector 11 (ZPR) is the "L" level during normal zoom operation. However, when the output signal from the photo-reflector 11 (ZPR) is brought to the "" level during zoom driving, it is judged as being out of the zoom operation range by erroneous count, and the ZMPLS is reset.

Figure 11:
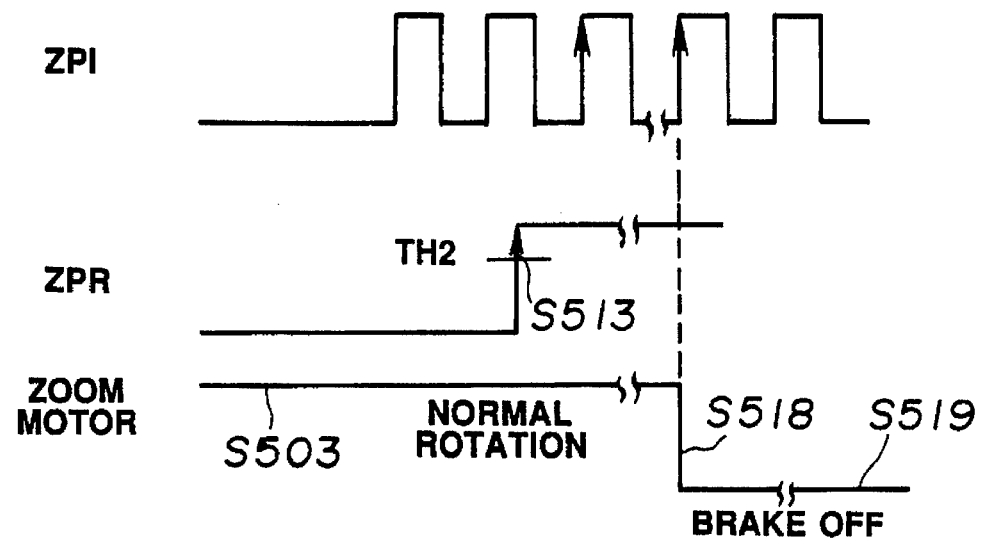
FIG. 11 is a time chart showing the relationship between the zoom motor and output signals from the zoom photo-reflector and the zoom photo-interrupter when the zoom lens is moved from the drum sinking position to the tele end position capable of photographing, in the zoom camera to which the first embodiment of the invention is applied.

Furthermore, when the output signal from the photo-reflector 11 (ZPR) is brought to the "H" level during zoom-down, the zoom motor 31 is normally rotated, and the above-described zoom processing is executed, to reset the count value. On the other hand, at zoom-up, when the output signal from the photo-reflector 11 (ZPR) is brought to the "H" level exceeding the threshold value #TH2 (refer to FIG. 11), pulses corresponding to the value #TELE Indicating the amount of movement from here to the tele end are counted, and the ZMPLS is reset to the number of pulses corresponding to the tele end position.

Figure 19:
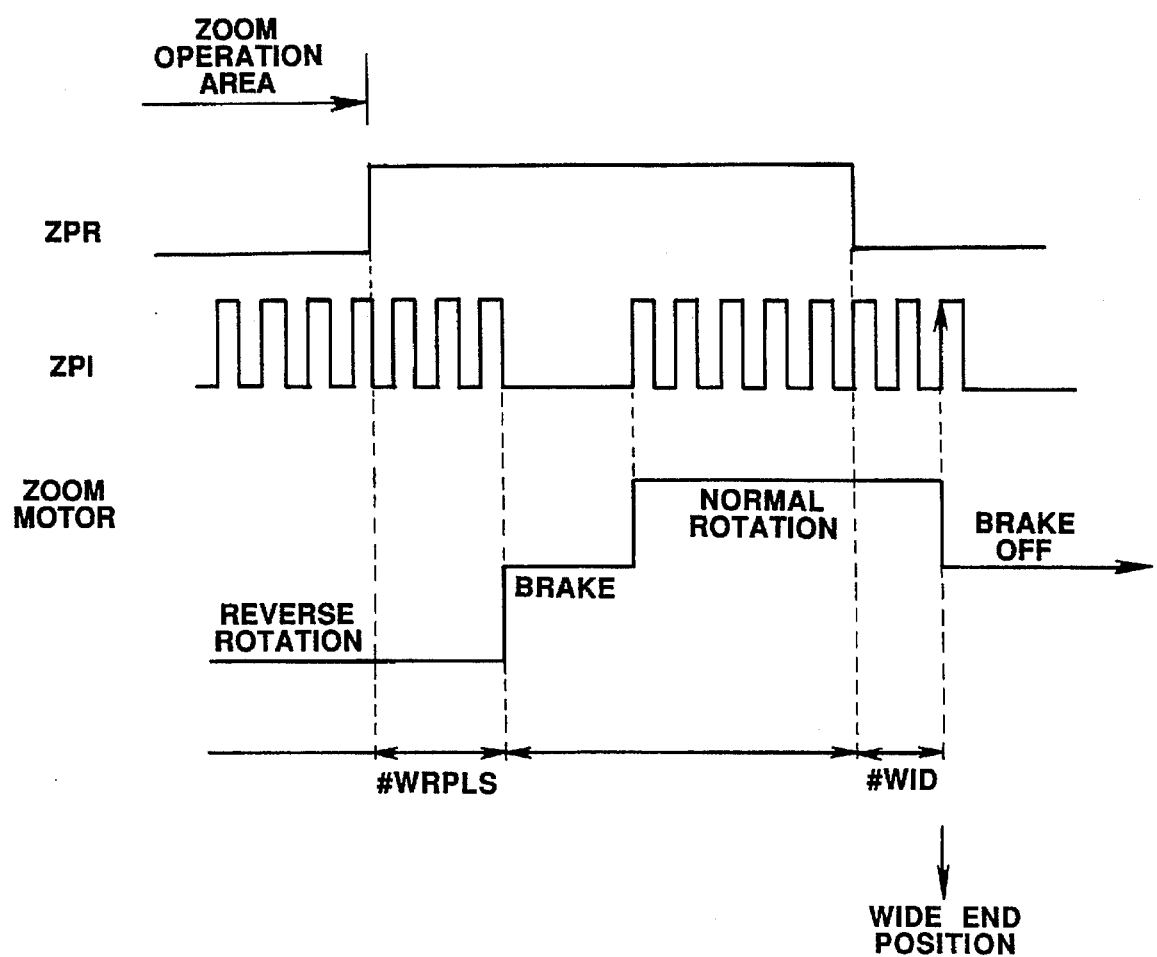
FIG. 19 is a time chart showing operation at the wide end when movement is made from the tele end to the wide end, in the first embodiment of the invention.

Operation at the wide end when it is moved from a location adjacent to the tele end to the wide end will next be described with reference to FIG. 19.

Figure 9:
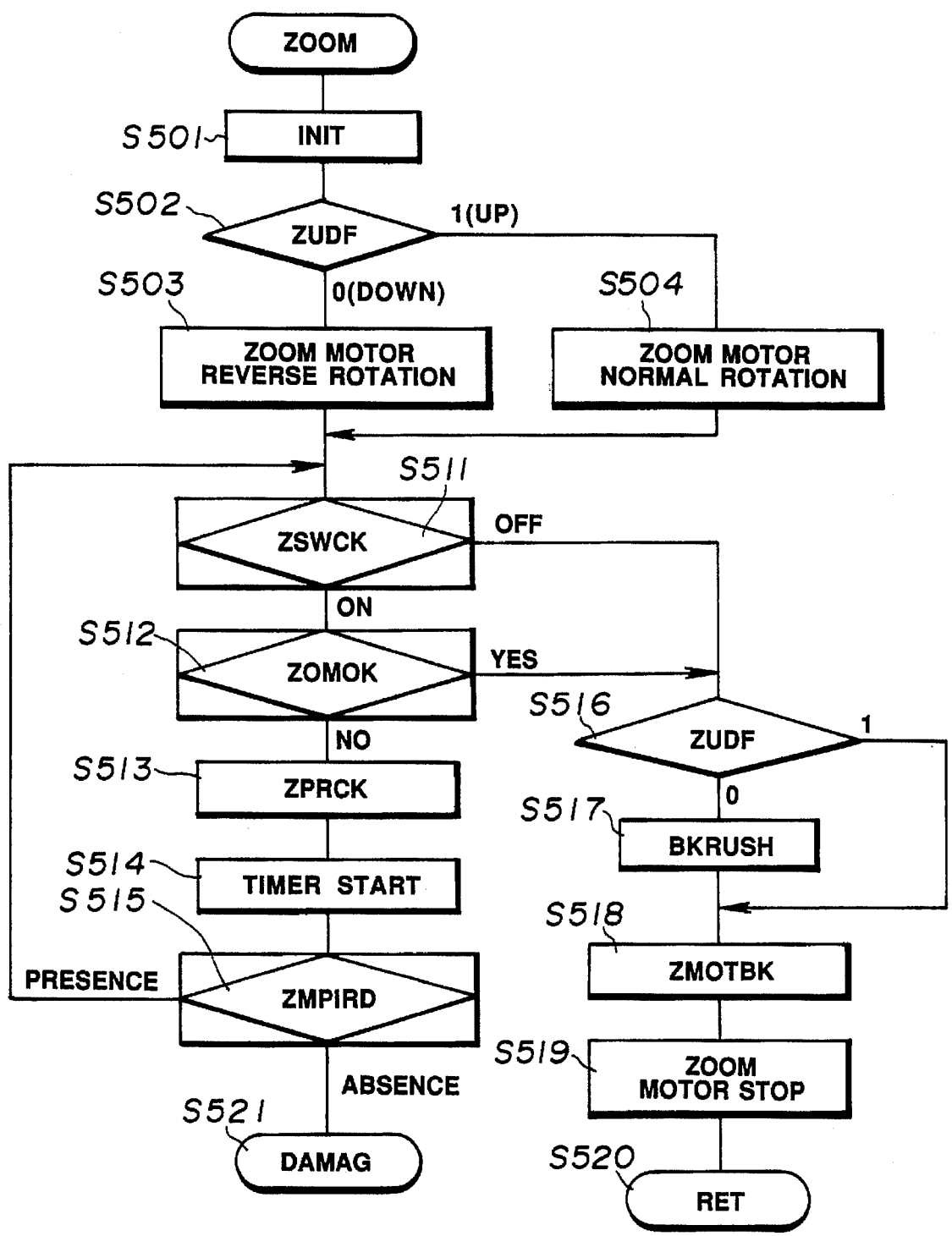
FIG. 9 is a flow chart showing zoom processing In the zoom camera to which the first embodiment of the invention is applied.

When zoom operation is executed between the wide end—the tele end, the ZMPLS is counted up or counted down, depending upon the rotational direction of the zoom motor as shown In FIG. 9. In a case where the zoom button is released from the tele toward the wide direction during driving, backlash removal is executed as shown in Step S517V.

When, in Step S513, the output signal from the photo-reflector 11 is brought to the "H" level during zoom-down, driving is made correspondingly to the number of pulses #WRPLS such that the output of ZPR is brought further surely to the "H" level. At this time, braking is applied to the motor.

The motor is again rotated normally. Braking is applied to the motor at the time counting is made correspondingly to the value #WIDE indicating the wide position from the time the ZPR is brought to the "L" level. The motor is turned off, and the program is returned to the main flow.

In this manner, zoom control including the backlash removal at the wide end is executed.

Subsequently, a timer for detecting the photo-interrupter 34 (ZPI) starts in Step S514. Pulse leading of the photo-interrupter 34 is checked in Step S515, to count up or count down the ZMPLS. Here, if there is no leading of the photo-interrupter 34 within a predetermined period of time, it is judged that there is a failure zoom motor 31 or the zoom encoder 10 is failure, and the program proceeds to abnormal processing (DAMAG) in Step S521.

The flag ZUDF is judged, and if ZUDF =0, Step S516 proceeds to Step S517.

Step S517 drives the mechanism in one direction, thereby to execute backlash removal of the gears. An amount of driving is that the zoom motor 31 is normally rotated, and the motor 31 halts or stops when a leading 1 (one) pulse of the photo-interrupter 34 is generated.

Subsequently, in Step S518, braking is applied to the zoom motor 31 for a predetermined period of time (ZMOTBK). In Step 519, the zoom motor 31 stops and, subsequently, the program is returned to the main routine (Step S520).

Figure 12:
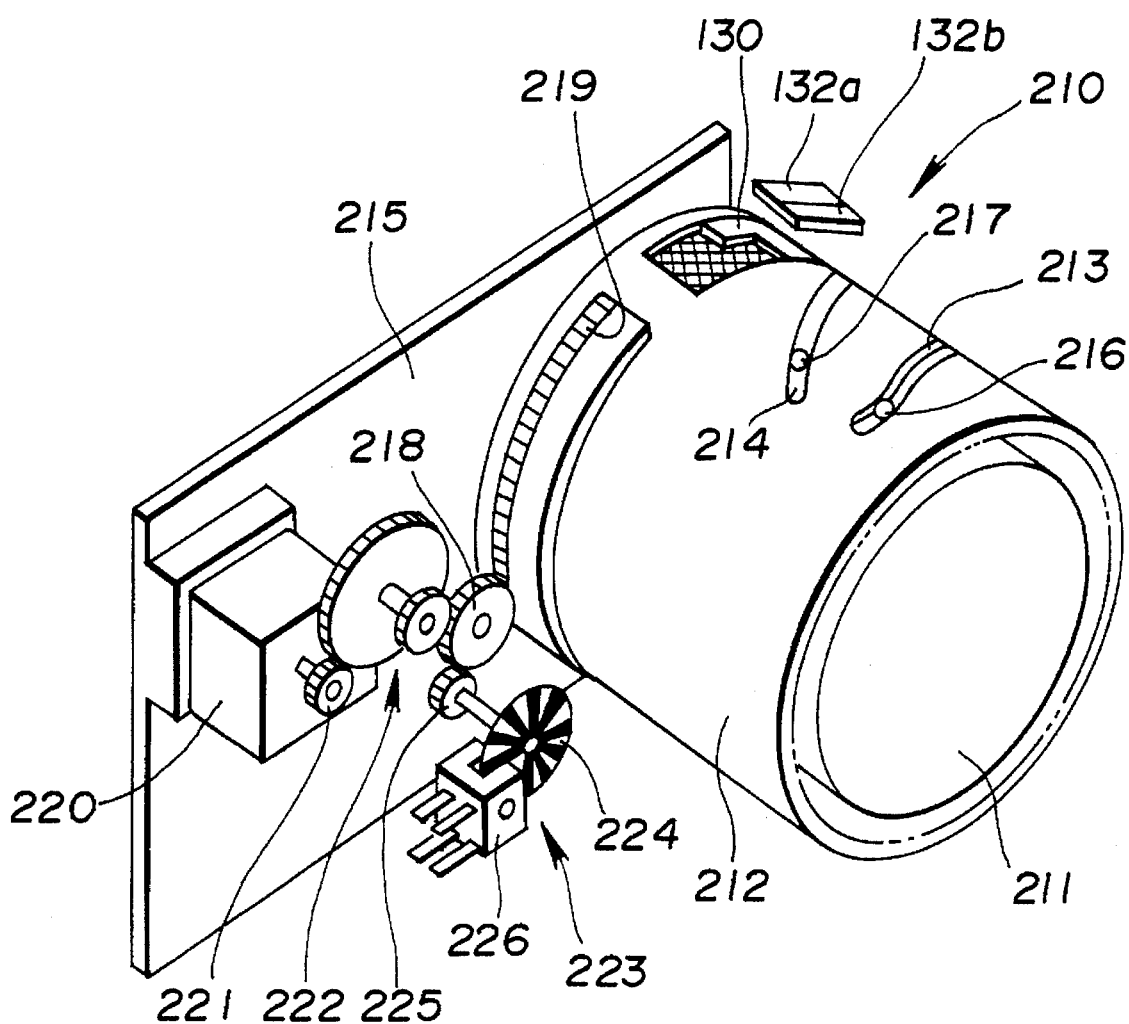
FIG. 12 is a perspective view of a zoom encoder showing a second embodiment of the invention.

FIG. 12 shows a second embodiment of the invention, in which a zoom encoder 210 is applied to a zoom lens barrel of a camera. A pair of inclined cam grooves 213 and 214 for moving a built-in group of zoom lenses 211 having a front group of lenses such as a variator or the like and a rear group of lenses such as a compensator or the like, in an optical axis direction are provided on a cam ring 212 which consists of a cam tube for driving the zoom lenses. A pair of guide pins 216 and 217 provided integrally with a front-group lens hold frame and a rear-group lens hold frame (both not shown) are inserted into the cam grooves 213 and 214.

A sector gear 219 for driving a ring in a peripheral direction is integrally provided on an outer peripheral surface adjacent to a proximal portion on the side of a camera body 215 of the cam ring 212. A driving gear 218 is in mesh with the sector gear 219. A rotational force of an output gear 221 of a motor 220 is transmitted to the driving gear 218 through a reduction gear train 222. Accordingly, when the motor 220 is rotatively driven normally or reversely, a rotational force thereof is transmitted to the driving gear 218 through the reduction gear train 222, whereby the cam ring 212 is rotated in a normal direction or a reverse direction about the optical axis. By cooperation between the cam grooves 213 and 214 and the guide pins 218 and 217, the front-group lens hold frame and the rear-group lens hold frame are so moved in the optical axis direction as to change the distance between the front group of lenses and the rear group of lenses, whereby zooming of the zoom photographing lens is executed.

Further, a gear 225 for rotatively driving a rotary plate 224 for generating pulses, of a pulse generator 223 is in mesh with the driving gear 218. The pulse generator 223 comprises the rotary plate 224 in which a plurality of light transmitting portions and a plurality of light shielding portions formed so as to be spaced circumferentially from each other at equal intervals and so as to extend radially are alternately formed, and a photo-interrupter 226 having a light illuminating portion and a light receiving portion arranged in facing relation to each other with a portion of the rotary plate 224 put therebetween. The pulse generator 223 is arranged such that the rotary plate 224 is rotated in interlocking relationship with rotation of the driving gear 218 for rotatively driving the cam ring 212, to output pulse signals P and I in response to angular movement of the cam ring 212 by the photo-interrupter 226.

A reading pattern 130 for an absolute-value encoder is formed on a part of the outer peripheral surface of the cam ring 212. The reading pattern 130 is formed by an irregular pattern having projections high in reflection and recesses of non-reflection. In the second embodiment of the invention, the outer peripheral surface of the cam ring per se is brought to the projections, while the recesses are formed by bores formed through the cam ring. That is, the reading pattern 130 is arranged as shown in FIG. 13 in a plan configuration in enlargement that its entire configuration consists of a rectangle having a width elongated peripherally, and the reading pattern 130 is formed by a recess having a bore 130a formed in an L-shaped manner at a left-hand portion of the rectangle and a bore 130b formed in the form of a rectangular bore at a right-hand upper half portion, and a projection formed at a central portion and having a high-reflectance portion 131a formed in a reversed L-shaped manner in opposed relation to the bore 130a and a high-reflectance portion 131b formed at a position in connection with the high-reflectance portion 131a and in opposed relation to the bore 130b.

A pair of photo-reflectors 132a and 132b are fixed to an immovable element (not shown) in side by side relation in an optical axis direction at positions opposed against the reading pattern 130 formed in this manner, that is, at positions located on the outside of the cam ring 212 and opposed against the reading pattern 130, as shown in FIG. 12. The photo-reflectors (P, R) 132a and 132b generate the output signals PR1 and PR2 of the absolute-value encoder.

Figure 13:
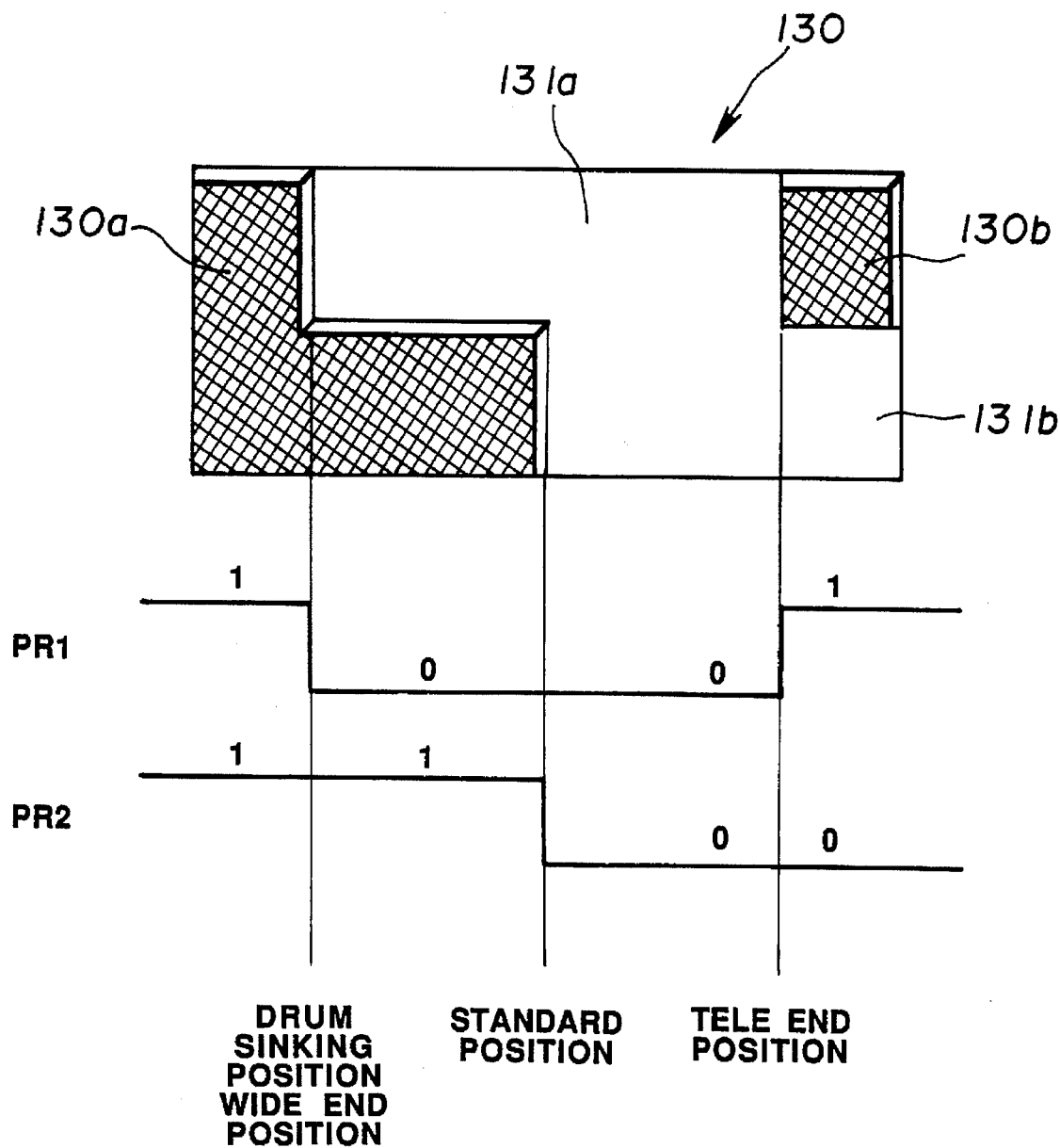
FIG. 13 is a diagrammatic view showing the relationship between a reading pattern of a photo-reflector and an output from a photo-reflector in the second embodiment of the invention.

That is, the photo-reflectors 132a and 132b are arranged such that, as shown in FIG. 13, their output signals PR1 and PR2 change as (1.1)→(0.1)→(0.0)→(1.0), with angular movement of the cam ring 212.

Here, changing points (1.1) and (0.1) are set as the drum sinking position;

A point A between (0.1) and (0.0) is set as the wide end (wide angle end) position;

Changing points (0.1) and (0.0) are set as the standard position (S position); and Changing points (0.0) and (1.0) are set as the tele end (telephoto) position.

In connection with the above, in the embodiment of the invention, it is assumed that a zoom lens whose zoom magnification or scale factor is 35 mm–80 mm is used. Then, the focal length is 35 mm at the wide end (W end position), and is 80 mm at the tele end (T end position).

Figure 14:
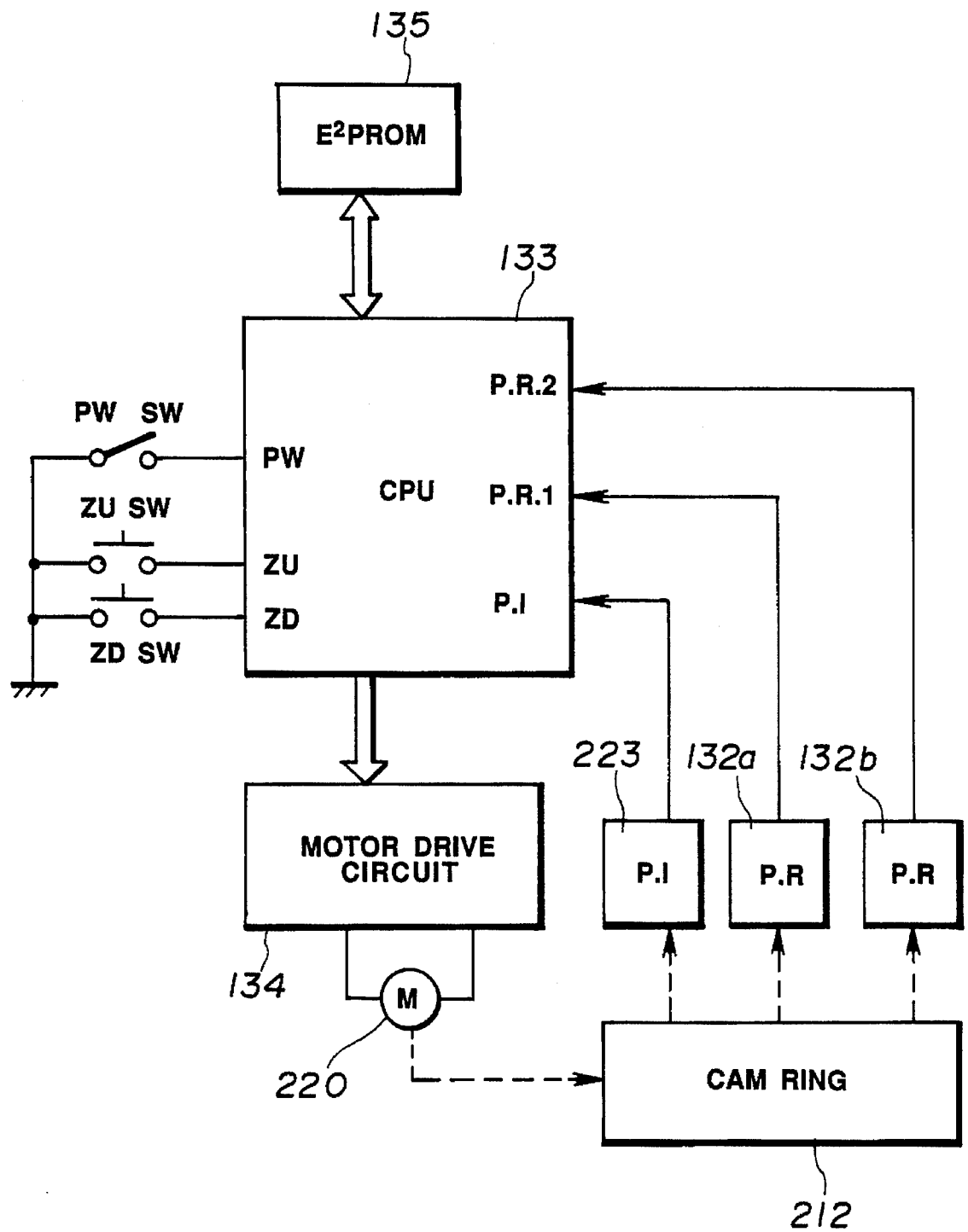
FIG. 14 is a block arrangement view of an electric circuit of a principal portion of a zoom encoder according to the second embodiment of the invention.
Figure 15:
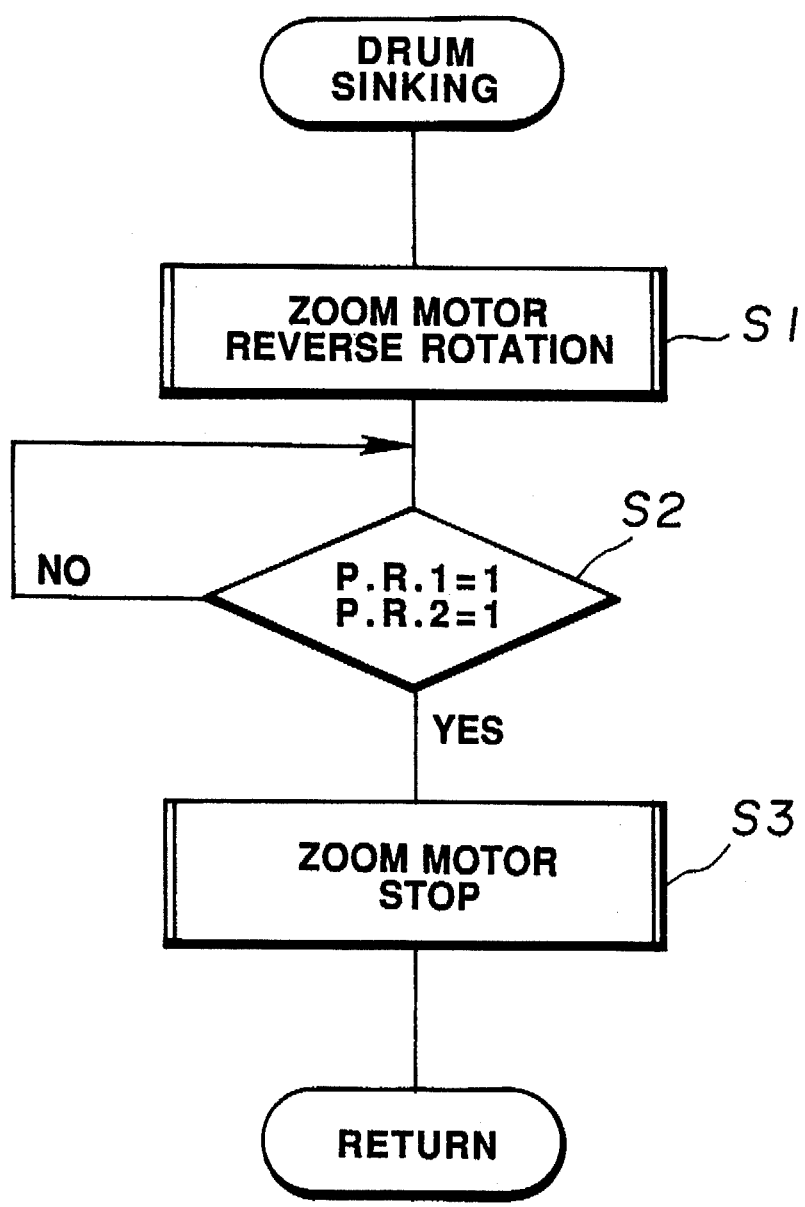
FIG. 15 is a flow chart of a program in a drum sinking routine of a zoom lens in a zoom camera to which the second embodiment of the invention is applied.

FIG. 14 shows an arrangement of a principal portion of an electric circuit of a camera to which the above-described zoom encoder is applied. Various operating signals including a power switch PWSW, a zoom-up switch ZUSW and a zoom-down switch ZDSW are inputted to a CPU 133 which sequence-controls the zooming operation and photographing operation of the camera. The CPU 133 controls a motor drive circuit 134 by these signals to control rotation of the drive motor 220. The pulse signals P and I of the pulse generator 223 outputted by angular movement of the cam ring 212, and the output signals PR1 and PR2 from the respective photo-reflectors 132a and 132b are monitored. In this connection, the number of pulses "10" indicating the wide end position and the number of pulses "40" indicating the S position are stored in a memory element 135 alternatively referred to as a first memory means consisting of an EEPROM.

Operation of the zoom lens having the zoom encoder according to the embodiment of the invention constructed as described above will next be described together with a plurality of flow charts illustrated in FIGS. 15–18.

First, when the power switch PWSW of the camera is turned off, the CPU 133 detects the turning-off, and surely sets the zoom lens to the drum sinking condition, to stop operation of the camera. That is, the drum sinking routine illustrated in FIG. 15 will be described. Then, the drum sinking region in the lens barrel is such that the outputs PR1 and PR2 from the photo-reflectors 132a and 132b are the regions of PR1=1 and PR2=1, respectively, as shown in FIG. 13. Accordingly, when the power switch PWSW is turned off, the CPU 133 gives a reverse rotation command of the zoom motor to the motor drive circuit 134 in Step S1, to reversely rotate the motor 220 until both the input ports P.R.1 and P.R.2 are brought to 1 while the motor 220 is reversely rotated. The CPU 133 checks this (Step S2). At the time both the input ports P.R.1 and P.R.2 are brought to 1, a motor stop command is given to the motor drive circuit 134, to stop rotation of the zoom motor 220 (Step S3), and a program is returned. This sets the zoom lens to the drum sinking position.

Figure 16:
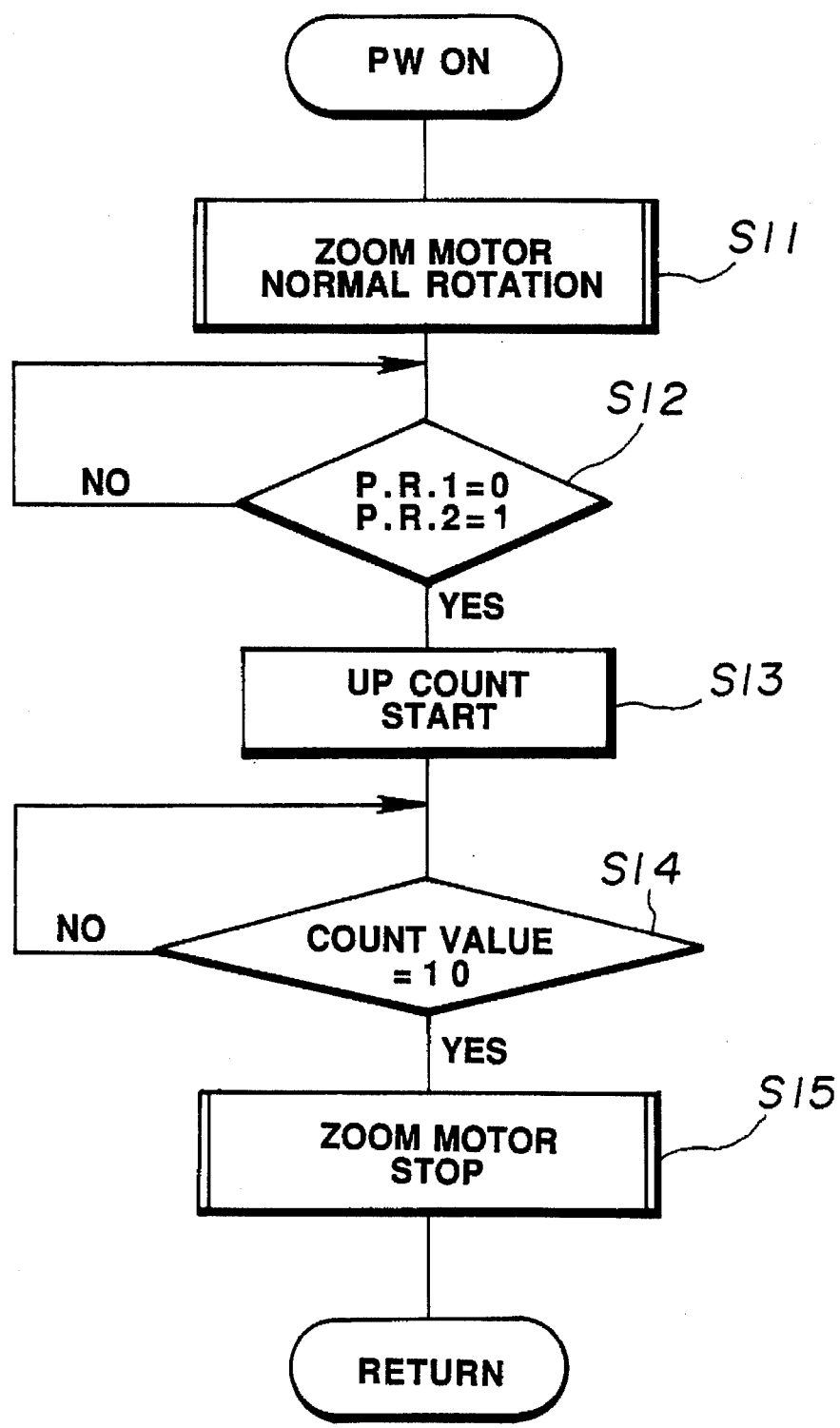

Next, when the power switch PWSW is turned on, the power-on routine operates as shown in FIG. 16, and the CPU 133 sets the zoom photographing lens from the drum sinking condition to an extension position "A" where the focal length is 35 mm, that is, the wide end W position. That is, when the power switch PWSW is turned on, the CPU 133 first gives a normal rotating command of the zoom motor to the motor drive circuit 134 (Step S11), and continues to monitor the input ports P.R.1 and P.R.2 while normal rotating the zoom motor 220 (Step S12). When the photographing lens is moved from the drum sinking condition position where the outputs P.R.1=1 and P.R.2=1 to a position where the outputs P.R.1=0 and P.R.2=1, the CPU 133 starts up-count of the pulse signal P.I from the pulse generator 223 in synchronism with the movement (Step S13), and checks the count value in Step S14. The CPU 133 continues rotation of the motor until the number of pulses indicating the wide end position written into the EEPROM 135 (refer to FIG. 14) reaches "10" (in decimal notation). When the prearranged number of pulses "10" is reached, rotation of the zoom motor 220 stops (Step S15), and the program is returned. Thus, the zoom lens is set to the wide end W position in which the focal length is 35 mm, from the drum sinking condition.

Figure 17:
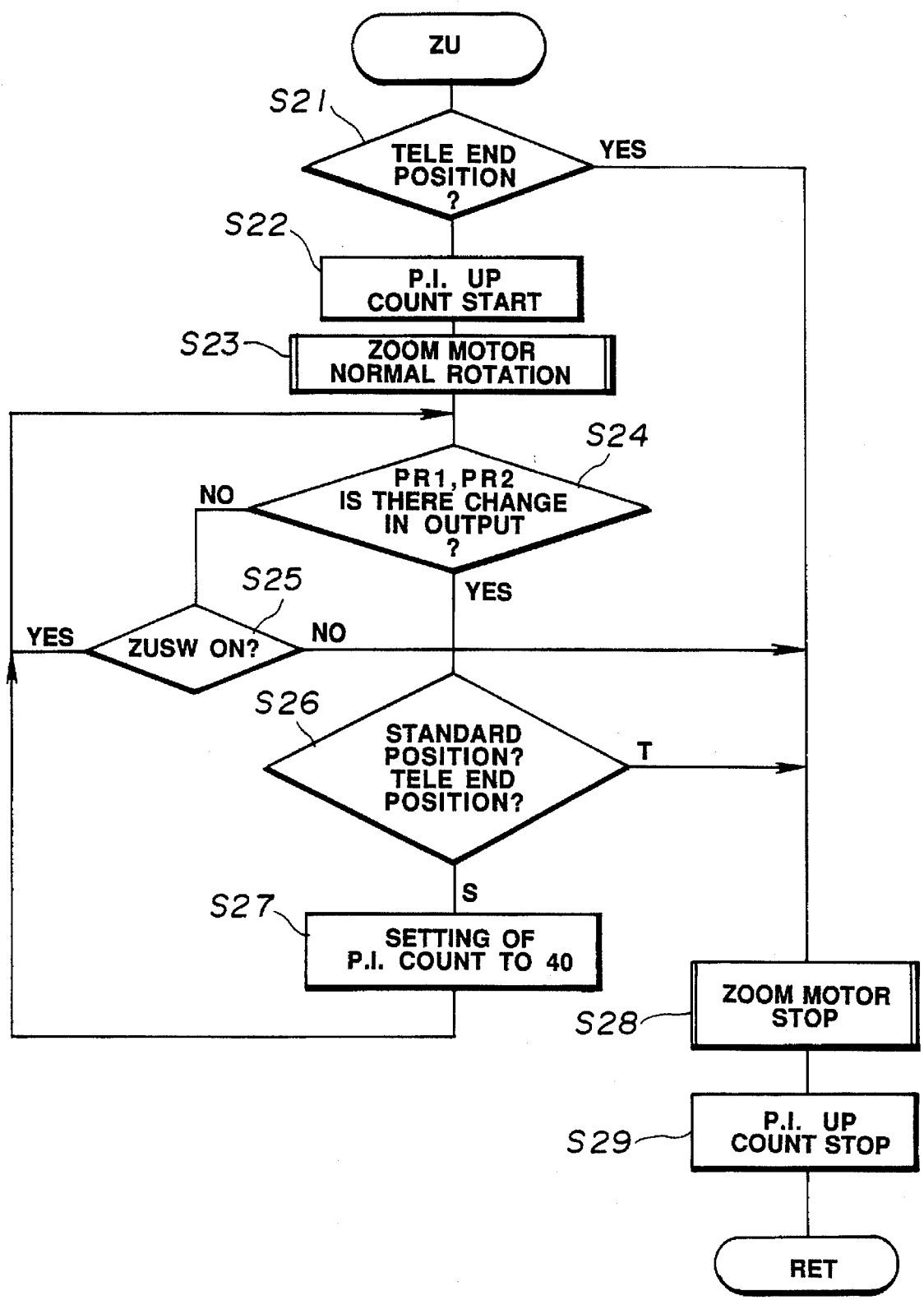

Next, when the photographer turns on the zoom-up switch ZUSW to execute the zoom-up operation, the ZU routine indicated in FIG. 17 operates. When the switch ZUSW is turned on, the CPU 133 first checks (Step S21) whether or not the switch ZUSW is in the tele end position (T end position) by the outputs PR1 and PR2 from the respective photo-reflectors 132a and 132b. If the switch ZUSW is in the tele end position (T end position), the program is transferred to Step S28 where stoppage processing is executed by a stoppage routine of the zoom motor. Up-count of the pulse signal P.I. from the pulse generator 223 is stopped (Step S29), and the program is returned.

Unless the switch ZUSW is in the tele end position (T end position), the program is transferred to next Step S22 where up-count of the pulse signal P.I. starts. In Step S23, the zoom motor 220 is normally rotated. During the rotation, the CPU 133 monitors the input ports P.R.1 and P.R.2 while up-count continues, to monitor a change in the outputs PR1 and PR2 (Step S24) and a condition of the zoom-up switch ZUSW (Step S25). When the switch ZUSW is turned off, that is, when the photographer decides a desirable zoom position, the program branches to Step S28 where the zoom motor 220 stops to stop up-count of the pulse signal P.I. (Step S29). Thus, the program is returned. If there is a change in the outputs PR1 and PR2 during stoppage (Step S24), it is ascertained or confirmed in Step 26 whether the switch ZUSW is in the S position or the T end position. If the switch ZUSW is in the T end position, the program branches to Step S28 where the zoom motor 220 stops to stop up-count of the pulse signal P.I. (Step S29), and the program is returned. If the switch ZUSW is in the S position, the count value of P.I. is set to "40" in Step S27, and the program is returned to Step S24. Here, the fact that the count value is set to the above-described value means that the count value is updated. Thus, it is possible to make precise the subsequent count value. In this manner, the encoder at zoom-up operation operates.

Figure 18:
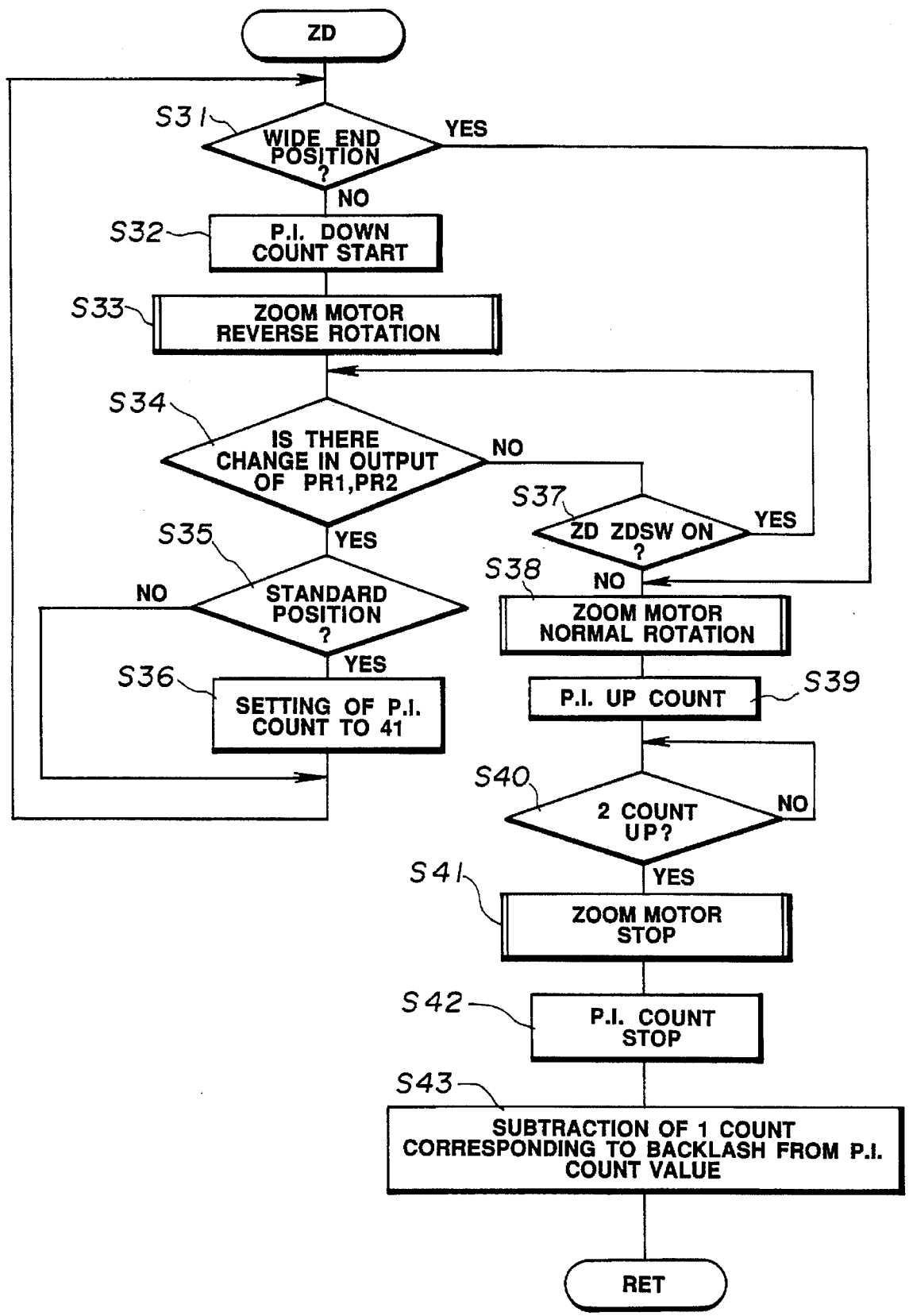

Next, when the photographer pushes the zoom-down switch ZDSW to execute zoom-down operation, a ZD routine illustrated in FIG. 18 operates. When the switch ZDSW is turned on, the CPU 133 detects the turning-on, and first ascertains or confirms whether or not the current count value of P.I. is equal to or less than the number of pulses "10" of the wide end position (Step S31). As a result, if the number of pulses is equal to or less than "10", the program branches to Step S38. If it is not the wide end, there is a lens at a position in the zoom-up direction. Accordingly, the lens is moved in the zoom-down direction. That is, down-count of P.I. starts (Step S32), and the zoom motor 220 is reversely rotated (Step S33). During the reverse rotation, a change in the outputs PR1 and PR2 (Step S34) and a condition of the zoom-down switch ZDSW are monitored (Step S37), while down-count continues. When the lens is moved to the zoom position where the photographer desires, the switch ZDSW is turned off. When the zoom-down switch ZDSW is turned off, the zoom motor 220 is normally rotated for backlash removal of the gears (Step S38). Up-count of P.I. is executed (Step S39). After a predetermined up-count (Step S40), for example, after 2 up-count, the zoom motor 220 stops (Step S41) to stop count of the pulse signal P.I. (Step S42). 1 (one) count corresponding to the backlash is subtracted from the counter of P.I. (Step S43), and the program is returned. Moreover, in Step S37, if the switch ZDSW is turned on, loop is taken so as to be returned to Step S34.

On the other hand, if there is a change in the outputs PR1 and PR2 in Step S34, check is executed whether or not it is in the S position in Step S35. If it is in the S position, the count of P.I is set to "40+(1 corresponding to backlash)=41" indicating the S position in Step S36, and the program is returned to Step S31. The fact that the count value is set to the above-described value in this manner means that the count value is updated. Accordingly, subsequent count values are made accurate. In this manner, the encoder at zoom-down operation operates.

In this invention, it is apparent that working modes different in a wide range can be formed on this basis of this invention without departing from the spirit and scope of the invention. This invention is not restricted by any specific embodiments expect as may be limited by the appended claims.

What is claimed is:

1. A zoom-focal-length detecting apparatus for a camera, comprising:

driving means for zooming a photographing zoom lens;

non-contact type pulse generating means for generating pulse signals in accordance with operation of said driving means;

means for counting said pulse signals;

non-contact type signal generator means for generating a signal for setting a count value of said count means at first predetermined value when said zoom lens is at a wide-end setting reference position and for setting a count value of said count means when said zoom lens is at a tele-end setting reference position;

means for storing a number of pulse signals representing movement of the zoom lens between a wide end and a wide-end setting reference position and for storing a number of pulse signals representing movement of the zoom lens between a tele-end and said tele-end setting reference position; and means for recognizing that said lens has moved to one of said wide end and said tele-end when a count of said pulse signals reaches said stored number responsive to generation of said setting signal.

2. A zoom-focal-length detecting apparatus for a camera, comprising:

driving means for zooming a photographing zoom lens;

pulse generating means of a non-contact type for generating a plurality of pulse signals in accordance with operation of said driving means;

means for counting said pulse signals;

non-contact type signal generating means for generating a signal for setting a count value of said count means when a wide-end setting reference position of at least said photographing zoom lens is reached as detected by a detecting means;

storing means for storing therein a predetermined value; and means for determining that said zoom lens has reached a wide end position when a number of pulse signals corresponding to said predetermined value is generated subsequent to generation of said setting signal.

3. A zoom-focal-length detecting apparatus, according to claim 2, wherein said stored predetermined value is a value corresponding to a number of pulses required until the photographing zoom lens reaches the wide end when moved from the wide-end setting reference position.

4. A zoom-focal-length detecting apparatus for a camera, comprising:

electrically driven driving means for zooming a photographing lens;

pulse generating means of a non-contact type for generating a plurality of pulse signals in accordance with operation of said electrically driven driving means;

means for counting said pulse signals;

non-contact type signal generating means for generating a signal for setting a count value of said count means when at least a wide-end setting reference position of said photographing lens is reached as detected by detecting means;

storing means for storing a predetermined value; and means for stopping said electrically driven driving means when a number of pulse signals corresponding to said predetermined value is generated from the time of generation of said setting signal.

5. A zoom-focal-length detecting apparatus according to claim 4, wherein said pulse generating means has patterns spaced from each other at predetermined intervals about a disc rotated by said electrically driven driving means, and a photo-electric signal generating element for reading said patterns.

6. A zoom-focal-length detecting apparatus according to claim 4, wherein said non-contact type signal generating means has predetermined patterns provided on a photographing-lens driving frame, and a photo-electric signal generating element for reading said patterns.

7. A zoom-focal-length detecting apparatus for a camera, comprising:

a photographing zoom lens;

drive means for moving said photographing zoom lens from a telephoto end position to a wide angle end position and for moving said zoom lens from said wide angle end position to a drum sinking position where the zoom lens is moved toward a camera body;

pulse generating means of a non-contact type for generating a plurality of pulse signals in accordance with operation of said drive means;

means for counting said pulse signals;

non-contact type signal generating means for generating a signal for setting a count value of said counting means when said zoom lens is at a wide-end setting reference position of said photographing lens;

means for storing a predetermined value; and means for stopping said drive means when a number of pulse signals corresponding to said predetermined value is accumulated, subsequent to a time of generation of a setting signal, when said lens system is moved from said sinking position.

8. A zoom-focal-length detecting apparatus for a camera, comprising:

drive means for zooming a photographing zoom lens;

pulse generating means of a non-contact type for generating a plurality of pulse signals in accordance with operation of said drive means;

means for counting said pulse signals;

non-contact type signal generating means for generating a first reference signal when said zoom lens is at a wide-end setting reference position and a second reference signal when said zoom lens is at a position intermediate between a wide end and a tele end;

means for storing a first pulse count for operating the drive means to move the zoom lens to a wide end from said wide-end setting reference position and a second pulse count representing said intermediate position; and control means for stopping said drive means when a number of pulse signals counted reaches said first count, and for setting a count value in said counting means equal to said second count upon generation of said second reference signal.

9. A zoom-focal-length detecting apparatus for a camera, comprising:

drive means for zooming a photographing zoom lens;

pulse generating means of a non-contact type for generating pulse signals in accordance with operation of said drive means;

means for counting said pulse signals;

non-contact type signal generating means for generating first, second and third reference signals when said zoom lens is at three respective positions including at least a wide-end setting reference position, an intermediate position between a wide end and a tele end, and a tele end position;

means for storing a first count representing a number of setting pulse signals required to move the zoom lens to a wide end from said wide-end setting reference position and a Second count representing a number of reference pulse signals at said intermediate position; and control means for stopping said drive means when a count of pulse signals reaches said first count subsequent to a time of generation of said first reference signal, for setting said second count in said counting means responsive to generation of said second reference signal, and for immediately stopping said drive means responsive to generation of said third reference signal.

* * * * *